(12) United States Patent
Tanaka et al.

(10) Patent No.: US 8,718,485 B2
(45) Date of Patent: May 6, 2014

(54) QUANTUM KEY DISTRIBUTION SYSTEM, OPTICAL TRANSMITTER, OPTICAL MODULATION CONTROL CIRCUIT, AND OPTICAL MODULATION CONTROL METHOD

(75) Inventors: Akihiro Tanaka, Tokyo (JP); Akio Tajima, Tokyo (JP); Seigo Takahashi, Tokyo (JP); Wakako Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 654 days.

(21) Appl. No.: 12/668,919

(22) PCT Filed: Jul. 9, 2008

(86) PCT No.: PCT/JP2008/062384
§ 371 (c)(1),
(2), (4) Date: Jan. 13, 2010

(87) PCT Pub. No.: WO2009/011255
PCT Pub. Date: Jan. 22, 2009

(65) Prior Publication Data
US 2010/0195831 A1    Aug. 5, 2010

(30) Foreign Application Priority Data
Jul. 13, 2007  (JP) ................................ 2007-184966

(51) Int. Cl.
*G02B 6/12*    (2006.01)
(52) U.S. Cl.
USPC ......................................................... 398/185

(58) Field of Classification Search
USPC .................................................. 398/185, 198
See application file for complete search history.

(56) References Cited

U.S. PATENT DOCUMENTS

| | | | | |
|---|---|---|---|---|
| 5,371,755 A | * | 12/1994 | Murata et al. | 372/38.02 |
| 5,373,389 A | * | 12/1994 | Huber | 398/194 |
| 7,289,738 B1 | * | 10/2007 | Roberts et al. | 398/140 |
| 7,539,360 B2 | * | 5/2009 | Tian et al. | 385/4 |
| 2007/0098402 A1 | * | 5/2007 | Maeda et al. | 398/38 |

FOREIGN PATENT DOCUMENTS

| | | |
|---|---|---|
| JP | 2000-517499 A | 12/2000 |
| JP | 2003-177361 A | 6/2003 |
| JP | 2003-243691 A | 8/2003 |
| JP | 2003-335228 A | 11/2003 |
| JP | 2004-093969 A | 3/2004 |
| JP | 2007-124484 A | 5/2007 |

OTHER PUBLICATIONS

International Search Report for PCT/JP2008/062384 mailed Sep. 30, 2008.

(Continued)

*Primary Examiner* — Danny Leung
(74) *Attorney, Agent, or Firm* — Sughrue Mion, PLLC

(57) ABSTRACT

In a quantum cryptographic transmitter (11), a phase modulator (1103, 1104) and an LN intensity modulator (1105) apply optical phase modulation and light intensity modulation to an optical signal based on desired data to generate a desired optical signal to be transmitted to a quantum cryptographic receiver (13). Based on the number of photons detected from the desired optical signal, a bias control circuit (1108) controls an operating point in light intensity modulation of the LN intensity modulator (1105).

23 Claims, 19 Drawing Sheets

(56) References Cited

OTHER PUBLICATIONS

G. Ribordy et al., "Automated 'plug and play' quantum key distribution", Electronic Letters, vol. 34, No. 22, Oct. 29, 2008, pp. 2116-2117.
B. Huttner et al., "Quantum cryptography with coherent states", Physical Review A, vol. 51, No. 3, Mar. 1995, pp. 1863-1869.
W. Hwang, "Quantum Key Distribution with High Loss: Toward Global Secure Communication", Physical Review Letters, vol. 91, No. 5, Aug. 1, 2003, pp. 05790-1-05790-4.
Y. Zhao et al., "Experimental Decoy State Quantum Key Distribution Over 15km", arXiv: quant-ph/0503192 v2 Mar. 25, 2005.
T. Kataoka., "Novel Automatic Bias Voltage Control for Travelling-Wave Electrode Optical Modulators", Electronic Letters, vol. 27, No. 11, May 23, 1991, pp. 943-945.
C. Bennett et al., "Generalized Privacy Amplification", IEEE Transactions on Information Theory, vol. 41, No. 6, Nov. 1995, pp. 1915-1923.
A. Tanaka et al., "Realizing Decoy State on a High-Speed Quantum Cryptosystem", Proceedings of ECOC2006, We3, p. 186, Sep. 24, 2006.
Y. Nambu et al., "BB84 Quantum Key Distribution System Based on Silica-Based Planar Lightwave Circuits", Japanese Journal of Applied Physics, vol. 43, No. 8B, pp. 1109-1110, dated Jul. 30, 2004.
G. Brassard et al., "Secret-Key Reconciliation by Public Discussion", EUROCRYPT '93 Proceedings, Lecture Notes in Computer Science, vol. 765, pp. 410-423, dated May 23, 1993.
N. Yoshikai et al., "Line cone and terminal configuration for very large-capacity optical transmission system," IEEE J'l on Selected Areas in Comm., Dec. 1986.
J. Sone, "Research and Development (Contract Research) for Commercialization of Quantum Cryptography", National Institute of Information and Communication technology, Collaborative Research Department, Contract Research Group, pp. 1-4, year 2006.
A. Tanaka et al., "Realizing Decoy State on a High-Speed Quantum Cryptosystem", IEICE, Proceedings of Communication Society Conference 2006, B-10-18, p. 212, dated Sep. 7, 2006.
A. Tanaka et al., "A Randomness Test on a Quantum Crypto-Key—Quantum Key Distribution Process for a Success in a Randomness Test", IEICE Technical Report, vol. 107, No. 89, pp. 19-24, dated Jun. 7, 2007.

* cited by examiner

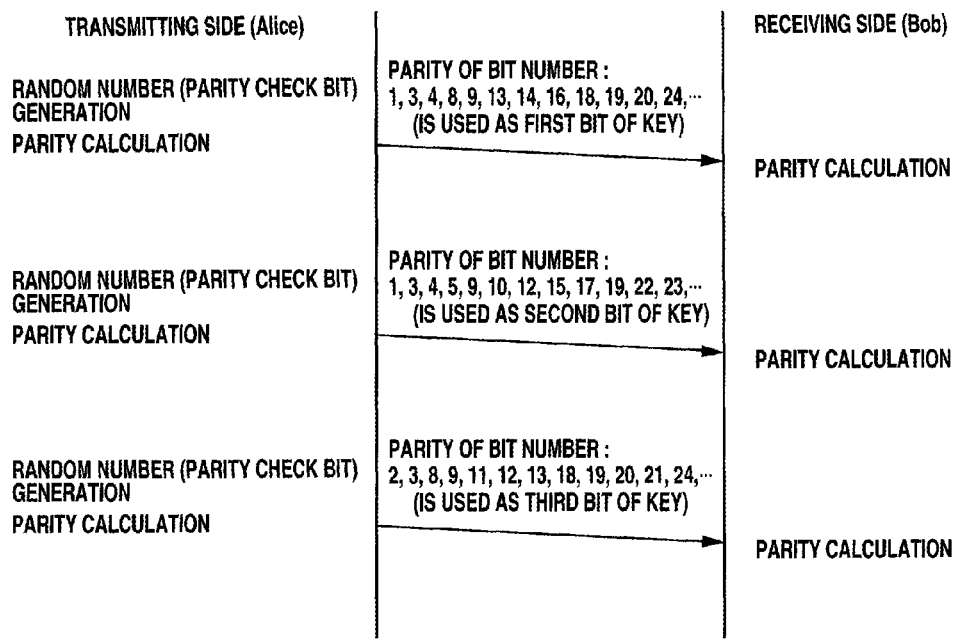
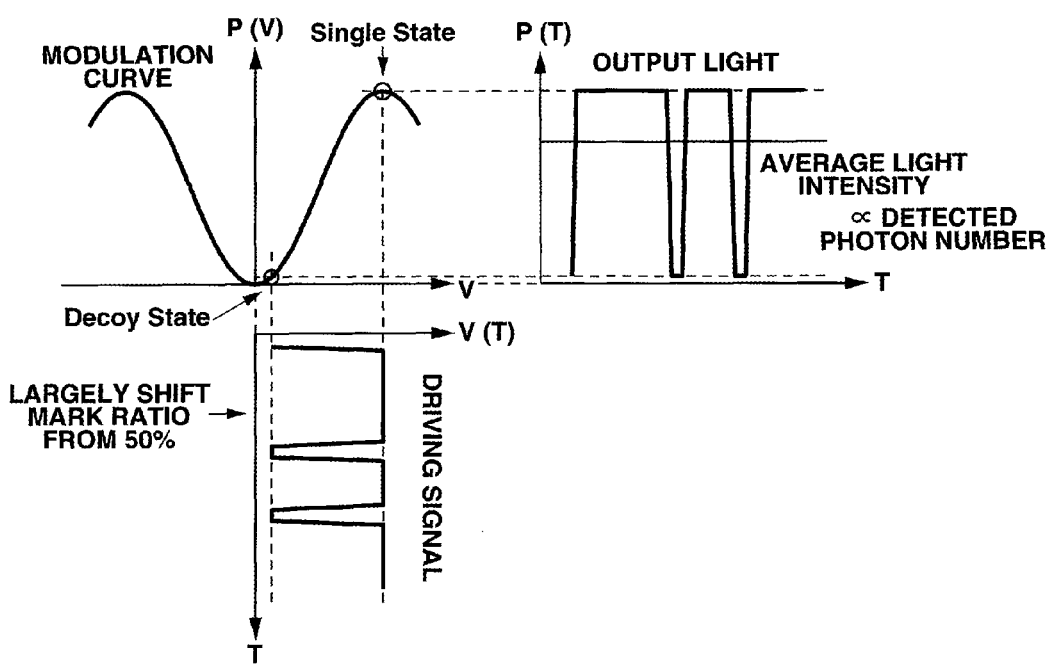

QUANTUM KEY DISTRIBUTION SYSTEM, OPTICAL TRANSMITTER, OPTICAL MODULATION CONTROL CIRCUIT, AND OPTICAL MODULATION CONTROL METHOD

This application is the National Phase of PCT/JP2008/062384 filed on Jul. 9, 2008, which is based upon and claims priority to Japanese Patent Application No. 2007-184966 filed on Jul. 13, 2007.

TECHNICAL FIELD

The present invention relates to an optical modulation technique and, more particularly, to an operating point control technique when modulating the intensity of an optical signal.

BACKGROUND ART

Although the rapidly growing Internet is convenient, there is great apprehension about its safety, and the need for an advanced cryptographic technique is intensifying to keep the confidentiality of communications. Cryptographic methods commonly used at present are classified into secret key cryptography such as DES (Data Encryption Standard) and Triple DES and public key cryptography such as RSA (Rivest Shamir Adleman) and elliptic curve cryptography. However, these cryptographic methods guarantee the safety based on "complexity of calculations". Code-breaking using an enormous amount of calculations and new decryption algorithms is an ever present danger.

Under these circumstances, research has been done on quantum cryptosystems which integrate an information transmission system and an encryption system using the principles of quantum mechanics. One of detailed examples is a quantum key distribution (QKD) system which has attracted much attention as an encryption key distribution technique that "never allows eavesdropping".

The quantum key distribution system generally uses photons as a communication medium and transmits information borne on the quantum state of the photons. An eavesdropper on the transmission path eavesdrops on information by, e.g., tapping photons that are being transmitted. However, once the photons are observed, it is impossible to completely restore their quantum state before observation due to the Heisenberg uncertainty principle. This causes a change in the statistics of received data detected by the authentic recipient. Detecting this change allows the recipient to detect the eavesdropper on the transmission path.

In a quantum key distribution system using the phase of photons, an optical interferometer is formed by a quantum cryptographic transmitter corresponding to a sender (so-called Alice) and a quantum cryptographic receiver corresponding to a recipient (so-called Bob). Each of the quantum cryptographic transmitter and the quantum cryptographic receiver modulates the phase of each photon at random. An output "0" or "1" is obtained depending on the difference in the depth of phase modulation. After that, the quantum cryptographic transmitter and the quantum cryptographic receiver collate some of conditions upon output data measuring. This finally enables the quantum cryptographic transmitter and the quantum cryptographic receiver to share the same bit string.

One of arrangements which are often used as arrangements most suitable for practical use is Japanese Patent Laid-Open No. 2000-517499 (to be referred to as reference 1 hereinafter) or a simpler Plug & Play method described in G. Ribordy, J. D. Gautier, N. Gisin, O. Guinard, and H. Zbindin, "Automated 'plug & play' quantum key distribution" (to be referred to as reference 2 hereinafter).

According to the method shown in FIG. 16, in a quantum cryptographic receiver 1303, an optical pulse in a multiphoton state is output from a laser diode 1335 via an optical circulator 1334. The optical pulse is then output to a polarization multiplexer/demultiplexer 1331 via an optical coupler 1333 and temporally divided. Two optical pulses that are orthogonally polarized are transmitted to a quantum cryptographic transmitter 1301 via an optical transmission path 1302.

In the quantum cryptographic transmitter 1301, the optical pulses from the quantum cryptographic receiver 1303 pass through a variable optical attenuator 1314, delay line 1313, and optical phase modulator 1312. A Faraday mirror 1311 reverses the traveling direction of the optical pulses and simultaneously rotates the polarization directions by 90°. The optical phase modulator 1312 applies a phase difference to the divided optical pulses, which then return to the quantum cryptographic receiver 1303 via the delay line 1313 and the variable optical attenuator 1314.

In this loopback structure, the interferometer which temporally divides optical pulses is the same as the interferometer which temporally couples them again. It is therefore possible to implement accurate interference if the interferometer maintains a predetermined optical path difference for only a time longer than the round trip time of optical pulses.

Since a useful single photon source does not yet exist, the quantum key distribution system is implemented in the real world by substitutionally using a method of causing a general laser diode (LD) for communication to generate an optical pulse and an optical attenuator to drop its light intensity to a single photon level. This optical pulse is called a WCP (Weak Coherent Pulse). Hence, the probability of having two or more photons per pulse still remains. This makes for advantage of an eavesdropper. Especially, an eavesdropping method called PNS (Photon Number Splitting) described in B. Huttner et al., "Quantum cryptography with coherent states", Physical Review A, Vol. 51, No. 3, p. 1863 (to be referred to as reference 3 hereinafter) allows an eavesdropper to perfectly eavesdrop bit information if two or more photons are included per pulse.

On the other hand, a defensive method against the PNS attack has also been proposed. For example, use of a decoy state described in W. Y. Hwang et al., "Quantum Key Distribution with High Loss: Toward Global Secure Communication", Physical Review Letters, Vol. 91, No. 5, 057901 (to be referred to as reference 4 hereinafter) allows to prevent the PNS attack even when using WCP. This technique generates both a signal state (for example, 0.6 [photons/pulse]) to be used for encryption key generation and a decoy state (for example, 0.1 [photons/pulse]) in which the photon number is changed to obtain photon detection information. The two states are randomly changed for each bit, thereby monitoring a change in the statistics of the number of received photons in case of PNS attack.

Y. Zhao et al., "Experimental Decoy State Quantum Key Distribution Over 15 km", quant-ph/0503192 (to be referred to as reference 5 hereinafter) has reported quantum key distribution experiments by such a technique using the same experimental system as the quantum key distribution system shown in FIG. 16. In this method, the quantum cryptographic transmitter 1301 causes the Faraday mirror 1311 to reflect an optical pulse from the quantum cryptographic receiver 1303, and the optical phase modulator 1312 to apply phase modulation ϕA. Then, the pulse is returned to the quantum cryptographic receiver 1303.

The quantum cryptographic receiver 1303 causes the polarization multiplexer/demultiplexer 1331 to demultiplex the optical pulse from the quantum cryptographic transmitter 1301 for a phase modulator 1332 and the optical coupler 1333. The phase modulator 1332 further applies phase modulation ϕB to the optical pulse. The optical pulse passes through the optical coupler 1333, and a photon detector 1336 detects photons. This makes it possible to share encryption keys "0" and "1" based on the value ϕA−ϕB. The average photon number, i.e., light intensity of each pulse is controlled by driving the variable optical attenuator 1314.

In reference 5, the means for controlling the light intensity of each optical pulse is commonly defined as a "variable optical attenuator". A. Tanaka et al., "Realizing Decoy State on a High-Speed Quantum Cryptosystem", Proceedings of ECOC2006, We3.P.186 (to be referred to as reference 6 hereinafter) describes an arrangement which enables to simultaneously modulate the phase and intensity of an optical signal by using a dual-drive Mach-Zehnder LN (LiNbO$_3$: lithium niobate) modulator as a photon number control means. Adopting such a modulation method makes it possible to achieve simpler modulation timing design, higher operation speed, and lower system cost.

To quickly modulate light intensity in optical communication, an LN intensity modulator using the light interference effect of a Mach-Zehnder interferometer or an EA (Electro-Absorption) modulator using the field absorption effect of a semiconductor is used in general. The latter EA modulator gives rise to frequency variation (chirping) upon intensity modulation and is therefore inappropriate for quantum key distribution using the phases of photons. For this reason, the most potent light intensity control means is the LN intensity modulator. However, the LN intensity modulator is susceptible to an operating point voltage shift due to DC drift or temperature drift.

The influence of drift and the principle of a common ABC (Auto Bias Control) circuit configured to compensate for drift will be explained below.

In a normal modulation operation, output light as shown in FIG. 17A is obtained. The modulation curve (transfer curve) of the LN intensity modulator is a function curve of cosine square. By supplying a driving signal according to the maximum and minimum points of the curve, an optical signal having the best characteristic, i.e., an optical signal having the highest extinction ratio (On/Off intensity ratio) can be obtained.

If the modulation curve drifts to the negative side (the left side in the drawing) in accordance with the driving signal, the output light changes as shown in FIG. 17B. In this example, it is impossible to completely extinguish the output light even by supplying a voltage "0" at which the light is extinguished best in FIG. 17A. Additionally, even when a voltage "1" at which the light is transmitted best is supplied, the output light is extinguished to some degree and becomes weaker.

On the other hand, if the modulation curve drifts to the positive side (the right side in the drawing) in accordance with the driving signal, the output light changes as shown in FIG. 17C. In this example as well, the extinction ratio of output light degrades. At this time, light intensity of "0" level becomes high, and light intensity of "1" level becomes low. The total intensity of the output light is almost constant independently of the presence/absence of drift. No accurate bias control can be done based on the light intensity information.

For this reason, to quickly modulate light intensity using LN intensity modulation in optical communication, such an operating point voltage shift needs to be compensated to ensure a stable light intensity modulation operation for a long time.

As a conventional bias control technique for a light intensity modulator, Japanese Patent Laid-Open No. 2004-093969 (to be referred to as reference 7 hereinafter) proposes arranging a monitor PD (photodiode) at the output of a Mach-Zehnder interferometer to monitor an optical signal after light intensity modulation and feeding back a pilot signal superimposed on the optical signal to bias control, as shown in FIG. 18A.

As shown in FIGS. 18B and 18C, a pilot signal having a frequency fp [Hz] is superimposed on a modulator driving signal. If the operating point is at a correct position, the "0" level and "1" level of the driving signal correspond to the minimal and maximal points of the modulation curve, respectively. Hence, the output light is turned at the poles and changes its intensity at a rate of 2 fp [Hz]. However, if the operating point is at a wrong position, the 2 fp [Hz] component is not generated in the output light. Using this phenomenon, the 2 fp [Hz] component superimposed on the output light after light intensity modulation is monitored, and bias control is performed to maximize the 2 fp [Hz] component in the output light. This enables to compensate for the drift.

In addition, T. Kataoka et al., "NOVEL AUTOMATIC BIAS VOLTAGE CONTROL FOR TRAVELING-WAVE ELECTRODE OPTICAL MODULATORS", ELECTRONICS LETTERS, Vol. 27, No. 11, p. 943 (to be referred to as reference 8 hereinafter) proposes a bias control method using the characteristic feature of a traveling-wave electrode. In this method, using the phenomenon that the band of a modulator largely decreases when the propagation direction of light is reverse to that of a modulator driving signal, the bias variation of a modulator is detected based on a variation in the average power of probe light that propagates reversely to the driving signal.

DISCLOSURE OF INVENTION

Problem to be Solved by the Invention

However, since the specific frequency component superimposed on the optical signal after light intensity modulation is monitored and fed back to bias control upon light intensity modulation, the related arts are not applicable to quantum communication that uses a low-intensity optical signal.

Since quantum communication uses a low-intensity optical signal, monitoring the optical signal yields only binary data representing that a photon is "1: detected" or "0: not detected" in each optical pulse. In addition, no photon is detected in most optical pulses because of the transmission path loss and the efficiency of the photon detector. Hence, the output obtained by monitoring an optical signal after light intensity modulation using a photon detector rarely includes a few "1" data (photon is detected) among many "0" data (photon is not detected).

Hence, for example, even when the pilot signal containing the 2 fp [Hz] component as shown in FIG. 18A is superimposed on the low-intensity optical signal, as in the related arts, it is impossible to appropriately monitor the frequency component and use it for bias control of light intensity modulation.

The present invention has been made to solve this problem, and has as its exemplary object to provide a quantum key distribution system, optical transmitter, optical modulation control circuit, and optical modulation control method which allow to appropriately control the operating point in light intensity modulation of an optical signal even in quantum communication that uses a low-intensity optical signal as a communication medium.

Means of Solution to the Problem

A quantum key distribution system according to an exemplary aspect of the invention includes a first optical phase modulator which modulates, based on a first random number, a phase of an optical pulse output from a photon source, a light intensity modulator which modulates, based on a second random number, an intensity of the optical pulse that has undergone phase modulation of the first optical phase modulator, and transmits the optical pulse to a second optical phase modulator via an optical transmission path, a second optical phase modulator which modulates, based on a third random number, the phase of the optical pulse received via the optical transmission path, a photon detector which detects a photon from the optical pulse that has undergone phase modulation of the second optical phase modulator, a first key distillation circuit which sends, to a second key distillation circuit, a photon detection result of each photon detected by the photon detector and random number information representing the third random number, a second key distillation circuit which generates an encryption key by collating the first random number with the photon detection result and the random number information sent from the first key distillation circuit, a counting circuit which counts the number of photons included in the optical pulse that has undergone intensity modulation of the light intensity modulator, and an optical modulation control circuit which controls an operating point of the light intensity modulator based on the photon number obtained by the counting circuit.

An optical transmitter according to another aspect of the invention includes an optical modulator which modulates an intensity of an input optical signal and outputs the optical signal, a driving signal generation circuit which generates a driving signal to control intensity modulation of the optical modulator and outputs the driving signal to the optical modulator, and an optical modulation control circuit which controls an operating point of the driving signal based on photon detection information about the number of photons detected from the optical signal that has undergone intensity modulation of the optical modulator.

An optical modulation control circuit according to still another aspect of the invention includes an information acquisition unit which acquires photon detection information about the number of photons detected from an optical signal which has undergone intensity modulation of an optical modulator, and an operating point control unit which controls an operating point of the optical modulator based on the photon detection information acquired by the information acquisition unit.

An optical modulation control method according to still another aspect of the invention includes controlling an operating point of an optical modulator based on photon detection information about the number of photons detected from an optical signal which has undergone intensity modulation of the optical modulator.

Effect of the Invention

According to the present invention, it is possible to detect, even in a low-intensity optical signal, the optical signal state after modulation as a detected photon number and control the operating point in light intensity modulation based on the detected photon number. This enables to appropriately control the operating point in light intensity modulation of an optical signal even in quantum communication that uses a low-intensity optical signal as a medium and maintain a stable optical modulation operation for a long time.

BRIEF DESCRIPTION OF DRAWINGS

FIG. 5 is a sequence chart of a known privacy amplification process;

FIG. 6A is a timing chart showing the optical modulation operation (normal) of an optical modulator in a quantum cryptographic transmitter;

BEST MODE FOR CARRYING OUT THE INVENTION

The exemplary embodiments of the present invention will now be described with reference to the accompanying drawings.

First Exemplary Embodiment

A quantum cryptosystem according to the first exemplary embodiment of the present invention will be explained first with reference to FIG. 1.

Figure 1:
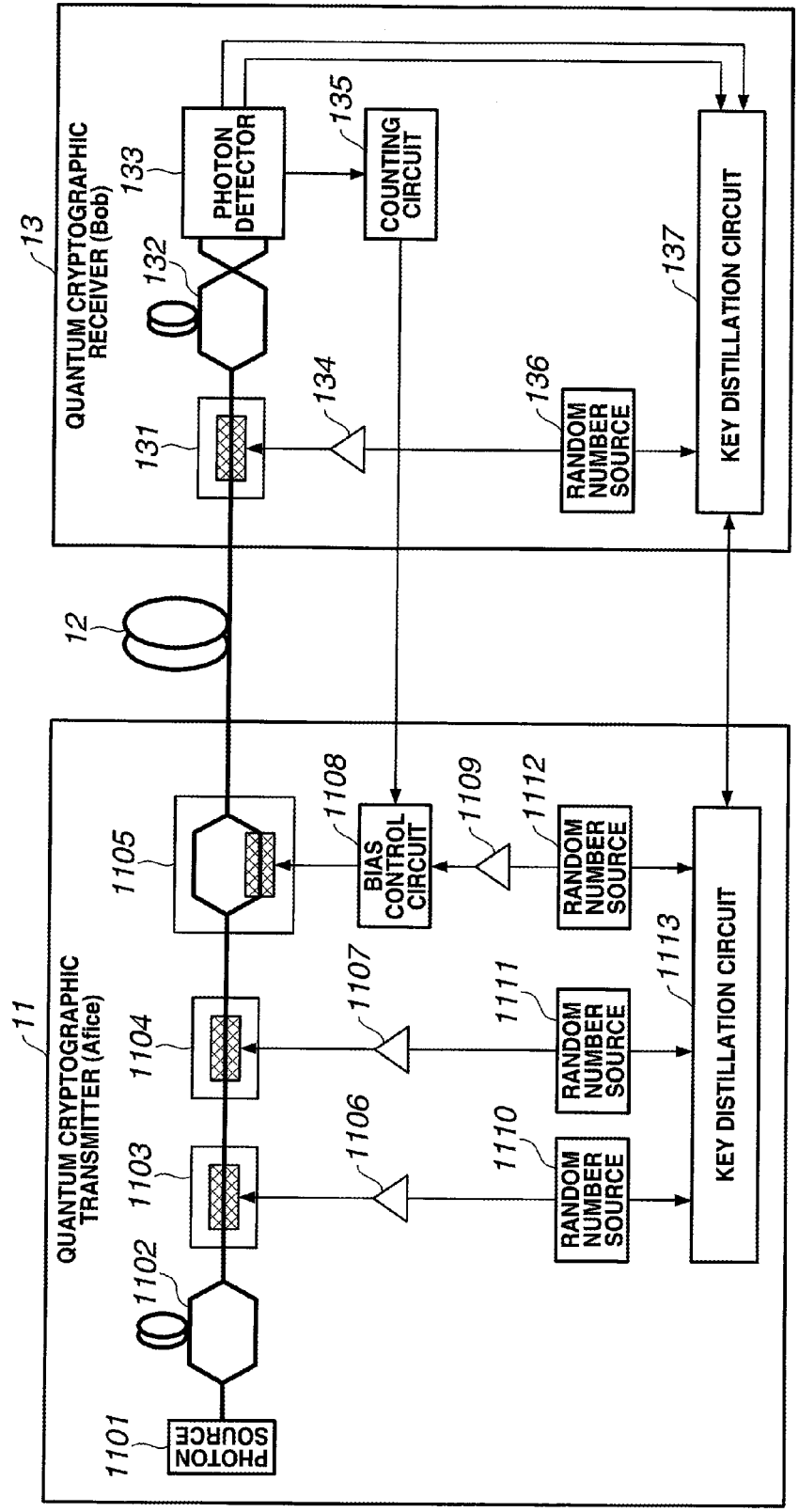
FIG. 1 is a block diagram showing an arrangement of a quantum cryptosystem according to the first exemplary embodiment of the present invention.

The quantum cryptosystem shown in FIG. 1 includes a quantum cryptographic transmitter 11 which optically modulates an optical signal having a low intensity of single photon level using desired data such as a random number or an encryption key and transmits the signal, and a quantum cryptographic receiver 13 which detects the optical signal received from the quantum cryptographic transmitter 11 via an optical transmission path 12 and outputs the original data.

In this exemplary embodiment, the quantum cryptographic transmitter 11 performs optical phase modulation and light intensity modulation of an optical signal based on desired data, thereby generating a desired optical signal to be transmitted to the quantum cryptographic receiver 13. The operating point in light intensity modulation is controlled based on the number of photons detected from the desired optical signal.

In this exemplary embodiment, one of quantum cryptosystems will be exemplified which is formed by introducing a decoy state to a one-way quantum key distribution system as described in Y. Nambu et al., "BB84 Quantum Key Distribution System Based on Silica-Based Planar Lightwave Circuits", Japanese Journal of Applied Physics, Vol. 43, No. 8B, 1109 (to be referred to as reference 9 hereinafter). The decoy state will be set as average photon number=0.1 [photons/pulse], and a signal state as average photon number=0.6 [photons/pulse] hereinafter.

The quantum cryptographic transmitter (optical transmitter) 11 is an optical communication apparatus configured to perform quantum communication by optically modulating an optical signal having a low intensity of single photon level. The quantum cryptographic transmitter 11 includes, as main functional units, a photon source 1101, asymmetric Mach-Zehnder interferometer 1102, phase modulators 1103 and 1104, LN intensity modulator 1105, modulator drivers 1106, 1107, and 1109, bias control circuit 1108, random number sources 1110 to 1112, and key distillation circuit 1113. The phase modulators 1103 and 1104 correspond to a first optical phase modulator of claim 1. The LN intensity modulator 1105 corresponds to an optical modulator of claim 5. The modulator driver 1109 corresponds to a driving signal generation circuit of claim 5. The key distillation circuit 1113 corresponds to a second key distillation circuit of claim 1. A random number generated by the random number sources 1110 and 1111 corresponds to a first random number of claim 1. A random number generated by the random number source 1112 corresponds to a second random number of claim 1.

In quantum cryptographic communication, the quantum cryptographic transmitter 11 causes the photon source 1101 to emit an optical pulse (photon pulse) having a low intensity of single photon level. Then, the asymmetric Mach-Zehnder interferometer 1102 temporally divides it to create double pulses. The phase modulators 1103 and 1104 apply phase modulation to one of the double pulses to generate a four-state phase modulated signal ("0", "π/2", "π", "3π/2"). The phase modulator 1103 is driven based on a random number output from the random number source 1110. The phase modulator 1104 is driven based on a random number output from the random number source 1111.

At this time, the gains of the modulator drivers 1106 and 1107 are set such that the phase modulator 1103 applies "0" or "π" phase modulation to the optical pulse, and the phase modulator 1104 applies "0" or "π/2" phase modulation to the optical pulse.

Figure 2A:
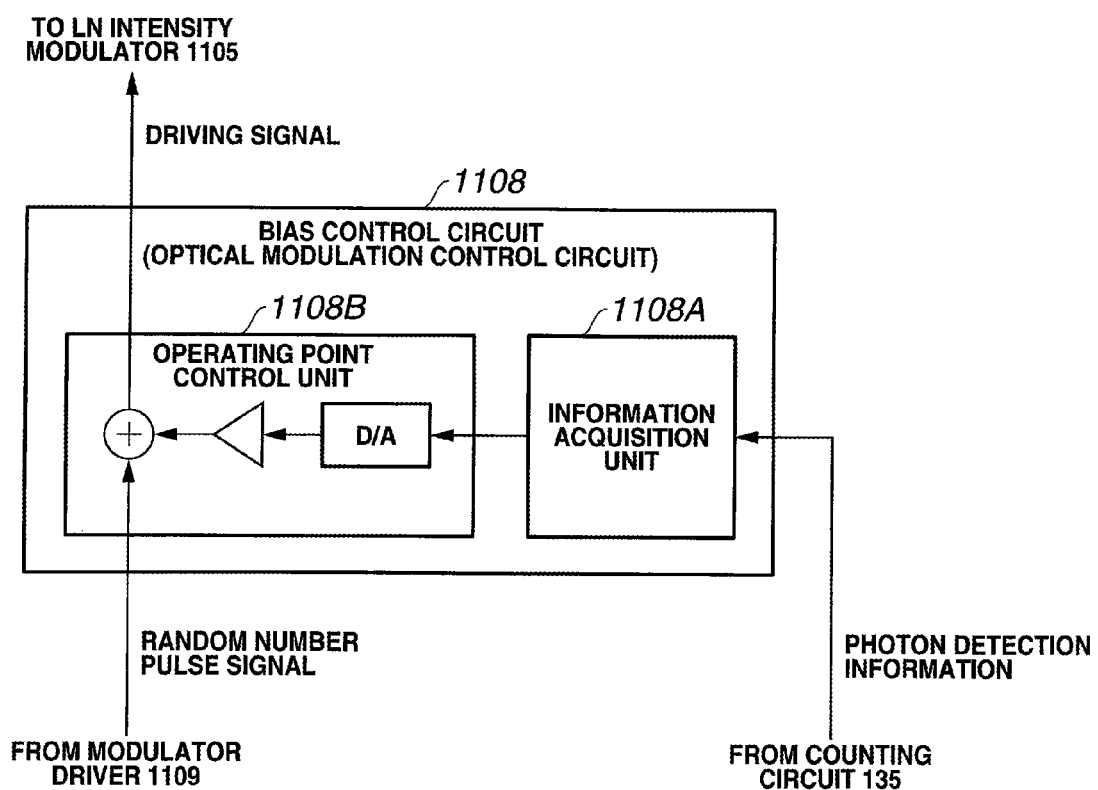
FIG. 2A is a block diagram showing an example of the arrangement of a bias control circuit.

As shown in FIG. 2A, the bias control circuit 1108 (optical modulation control circuit) includes an information acquisition unit 1108A which receives a data signal transmitted from a counting circuit 135 to acquire photon detection information sent from the counting circuit 135, and an operating point control unit 1108B which controls, based on the photon detection information, the bias voltage of a driving signal to control intensity modulation of the LN intensity modulator 1105, thereby controlling the operating point. The operating point control unit 1108B controls the operating point of the LN intensity modulator 1105 based on the photon detection information acquired in the quantum cryptographic receiver 13.

Unlike the random number sources 1110 and 1111, the random number source 1112 generates, for example, a random number whose mark ratio representing the radio of "1" per unit time is shifted from 50% as a random number that takes a plurality of different amplitude values having an offset appearance frequency, and based on the obtained random number pulse signal, outputs an electrical signal that takes a plurality of different amplitude values, for example, two values as a driving signal. The two intensity values correspond here to the signal state and the decoy state.

In the bias control circuit 1108, the operating point control unit 1108B D/A-converts the photon detection information (digital information) acquired by the information acquisition unit 1108A. A driver then converts the data into an appropriate DC bias control voltage. Finally, an adder adds the bias control voltage to the random number pulse signal, i.e., the driving signal input from the random number source 1112 via the modulator driver 1109, and outputs the driving signal to the LN intensity modulator 1105.

The LN intensity modulator 1105 is driven by the driving signal, which contains the random number pulse signal from the random number source 1112 and is bias-controlled based on the photon detection information, so as to apply binary intensity modulation to the optical pulse from the phase modulator 1104. The LN intensity modulator 1105 thus applies intensity modulation of different modulation factors to each optical pulse of the input optical signal based on the driving signal at a nonuniform frequency.

The optical pulses which have individually undergone phase modulation and intensity modulation based on the random numbers in the quantum cryptographic transmitter 11 in the above-described way pass through the optical transmission path 12 and enter the quantum cryptographic receiver 13.

The quantum cryptographic receiver 13 is an optical communication apparatus configured to perform quantum communication by optically modulating an optical signal having a low intensity of single photon level. The quantum cryptographic receiver 13 includes, as main functional units, a phase modulator 131, asymmetric Mach-Zehnder interferometer 132, photon detector 133, modulator driver 134, counting circuit 135, random number source 136, and key distillation circuit 137. The phase modulator 131 corresponds to a second optical phase modulator of claim 1. The key distillation circuit 137 corresponds to a first key distillation circuit of claim 1. A random number generated by the random number source 136 corresponds to a third random number of claim 1.

The quantum cryptographic receiver 13 causes the phase modulator 131 to apply "0" or "π/2" binary phase modulation to the other optical pulse out of the double pulses which has not undergone the modulation in the quantum cryptographic transmitter. Then, the asymmetric Mach-Zehnder interferometer 132 having the same optical path difference as that of the asymmetric Mach-Zehnder interferometer 1102 on the quantum cryptographic transmitter side makes the two pulses interfere with each other. The interfered optical pulse is detected using the photon detector 133 in a balanced gate mode described in Japanese Patent Laid-Open No. 2003-243691 (to be referred to as reference 10 hereinafter). The key distillation circuits 1113 and 137 generate a final key based on the random numbers used for modulation and photon detection information detected by the photon detector 133.

The quantum cryptographic receiver 13 causes the counting circuit 135 to measure the photon number (detected photon number) per unit time in the photon detector 133 and transmit it by a data signal to the bias control circuit 1108 of the quantum cryptographic transmitter 11 as photon detection information.

The bias control circuit 1108 includes the information acquisition unit which receives the data signal transmitted from the counting circuit 135 to acquire the photon detection information sent from the counting circuit 135, and the operating point control unit which controls the operating point of the LN intensity modulator 1105 based on the photon detection information. The operating point control unit controls the bias of the driving signal of the LN intensity modulator 1105 based on the photon detection information acquired by the information acquisition unit.

Although the random number source 1112 needs to output a random number having a mark ratio other than 50%, the random numbers must have neither periodicity nor regularity. This is necessary to prevent an eavesdropper from estimating the average photon number of each pulse.

Figure 2B:
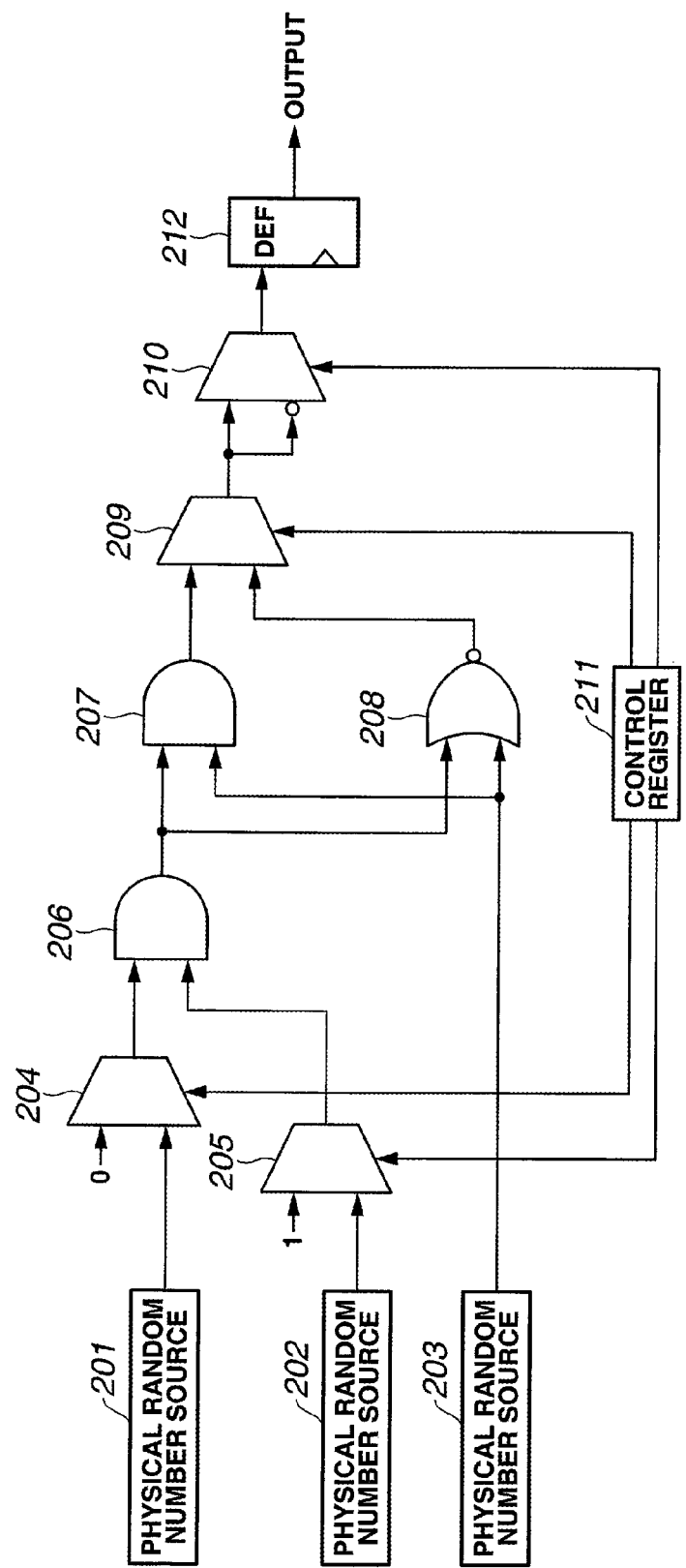
FIG. 2B is a block diagram showing an example of the arrangement of a random number source.

As shown in FIG. 2B, each of the random number sources 1110 to 1112 is formed from a combined circuit of selectors 204, 205, 209, and 210, gate circuits 206 to 208, and DFF 212.

In the random number sources 1110 to 1112, a control register 211 performs switching control of the selectors 204, 205, 209, and 210 so that random number output data from physical random number sources 201 to 203 are combined at a desired mark ratio and output from the DFF 212 in synchronism with a predetermined clock. Use of this circuit allows to set the mark ratio of the output random number from 0 to 100% in 12.5% steps. To eliminate regularity of random numbers, an output random number is created based on the random numbers output from the physical random number sources 201 to 203.

To output a random number having a mark ratio of 50%, switching is done to cause the selector 204 to output "0" so that the AND gate 206 always outputs "0". The NOR gate 208 outputs the reversed data of the output from the physical random number source 203. Hence, when the selector 209 selects the output of the NOR gate 208, the output random number obtains a mark ratio of 50% independently of the setting of the selector 210. To output a random number having a mark ratio of 25% or 75%, switching is done to cause the selector 204 to select the output of the physical random number source 201 and cause the selector 205 to output "1". Since the AND gate 206 outputs the output from the physical random number source 201, the random number output from the AND gate 207 obtains a mark ratio of 25%. Causing the selector 209 to select the output of the AND gate 207 and switching the selector 210 enable to switch the mark ratio of the output random number between 25% and 75%.

To output a random number having a mark ratio of 12.5% or 87.5%, the selector 204 selects the output of the physical random number source 201, and the selector 205 selects the output of the physical random number source 202. Since the AND gate 207 outputs a random number having a mark ratio of 12.5%, causing the selector 209 to select the output of the AND gate 207 and switching the selector 210 enable to switch the mark ratio of the output random number between 12.5% and 87.5%. Finally, to output a random number having a mark ratio of 37.5% or 62.5%, the selector 204 selects the output of the physical random number source 201, and the selector 205 selects the output of the physical random number source 202. Since the mark ratio of the random number output from the NOR gate 208 is 37.5%, causing the selector 209 to select the output of the NOR gate 208 and switching the selector 210 enable to switch the mark ratio of the output random number between 37.5% and 62.5%.

Figure 3:
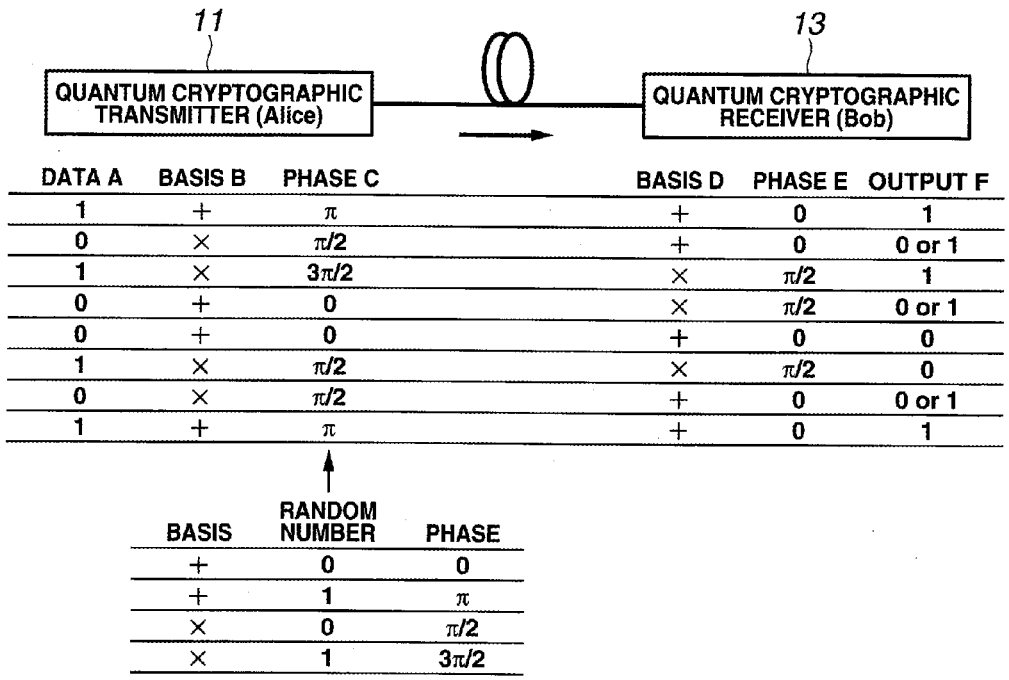
FIG. 3 is an explanatory view showing the concept of quantum key distribution using the phases of photons.

FIG. 3 illustrates a case in which the quantum cryptographic transmitter 11 and quantum cryptographic receiver 13 shown in FIG. 1 are respectively used as the transmitting side and receiving side of the quantum key distribution system. In this case, random numbers output from the random number sources 1110 and 1111 in the quantum cryptographic transmitter 11 correspond to data A and a basis B on the transmitting side of FIG. 3. The phase of a phase-modulated signal output from the phase modulator 1104 corresponds to a phase C on the transmitting side of FIG. 3. Note that the random number output from the random number source 1112 is a random number to be used for light intensity modulation.

On the other hand, the random number output from the random number source 136 of the quantum cryptographic receiver 13 corresponds to a basis D on the receiving side of FIG. 3. The phase of a phase-modulated signal output from the phase modulator 131 corresponds to a phase E on the receiving side of FIG. 3. Random number information output from the photon detector 133 to the key distillation circuit 137 of the quantum cryptographic receiver 13 corresponds to an output F (photon detection information).

The key distillation circuit 137 sends the photon detection information detected by the photon detector 133 and the random number information representing the random number generated by the random number source 136 to the key distillation circuit 1113 via a communication line different from the optical transmission path 12. The key distillation circuit 1113 collates the photon detection result and random number information sent from the key distillation circuit 137 with the random numbers generated by the random number sources 1110 to 1112, thereby generating an encryption key.

In a quantum key distribution method using phases of photons, the sender and recipient (to be referred to as Alice and Bob hereinafter) organize an interferometer. Alice and Bob randomly apply phase modulation to each photon. An output "0" or "1" is obtained depending on the difference in the depth of phase modulation. After that, Alice and Bob collate some of conditions upon measuring the output data. This finally enables Alice and Bob to share the same bit string. The shared bit string will be referred to as a secret bit string (secret key) hereinafter.

Thus shared secret bit strings $K_A$ and $K_B$ contain errors ascribed to the performance of the transmission path and receiver. To generate a final encryption key, an encryption key extraction operation is necessary. This operation includes an error correction process, a residual error detection process of confirming, before a privacy amplification process of the succeeding stage, that the shared bit strings contain no error, and the privacy amplification process of sifting key information assuming that an error has occurred due to eavesdropping on the transmission path.

As a related art of the error correction process, there is a method as described in G. Brassard and L. Salvail, "Secret-key Reconciliation by Public Discussion", in Advances in Cryptography—EUROCRYPT '93 Proceedings, Lecture Notes in Computer Science, Vol. 765, pp. 410-423 (to be referred to as reference 11 hereinafter). In this method, each of the sender and recipient divides a secret bit string into a plurality of blocks, collates the parities of the blocks to specify a block including an error, and applies a Hamming code to the block to correct the error. Additionally, assuming that one block includes an even number of errors, secret bit strings are rearranged at random, and parity collation and error correction are performed again. For the random substitution, it is necessary to share random numbers different from the secret bit strings $K_A$ and $K_B$. To avoid confusion with the above-described random numbers (secret bit strings) shared in the quantum key distribution, a random number used in the encryption key extraction operation will simply be referred to as a shared random number hereinafter. In this process, the secret bit strings $K_A$ and $K_B$ are compressed into $K_A'$ and $K_B'$.

Figure 4:
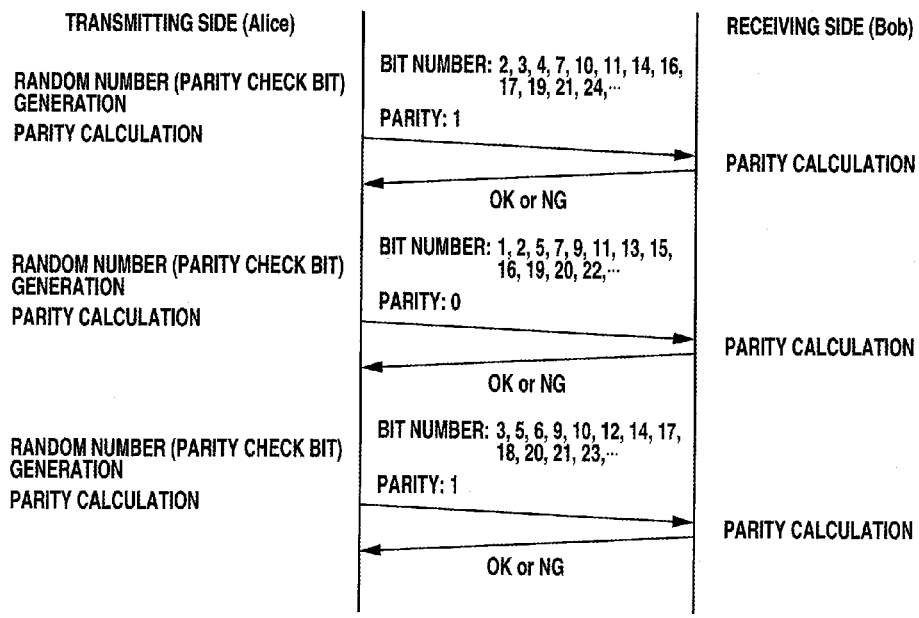
FIG. 4 is a sequence chart showing a conventional example of a residual error detection process.

As shown in FIG. 4, in the related art of the residual error detection process, Alice generates a random number (parity check bit information) inside. Alice then calculates, for the secret bit string $K_A'$ held by herself after error correction, the parity at the bit position designated by the random number, and transmits the parity to Bob together with the random number (parity check bit information). Based on the received random number, Bob calculates the parity of the secret bit string $K_B'$ held by himself. Bob determines whether the parity coincides with that calculated by Alice and notifies the sender of OK or NG. The above-described confirmation operation is repeated a plurality of number of times (V times), thereby detecting errors remaining in the secret bit strings. The V-bit keys are discarded because the above-described making the parity bits open to the public leads to leakage of V-bit information to a third party. In this process, the secret bit strings $K_A'$ and $K_B'$ change to $K_A''$ and $K_B''$.

As a related art of the privacy amplification process, there is a method as described in C. H. Bennet, G. Brassard, C. Crepeau, and U. M. Maurer, "Generalized Privacy Amplification", IEEE Trans. Inf. Theory, Vol. 41, No. 6, p. 1915 (to be referred to as reference 12 hereinafter). As shown in FIG. 5, in the known privacy amplification process, Alice generates a random number (parity calculation bit) inside. Alice then calculates, for the secret bit string $K_A''$ held by herself, the parity at the bit position designated by the random number, and uses the parity as a 1-bit key. Next, Alice transmits the random number (parity calculation bit) to Bob. Based on the received random number, the recipient calculates the parity of the secret bit string $K_B''$ held by himself and uses the parity as a 1-bit key. The above-described operation is repeated, and an amount of information supposed to have been eavesdropped on the transmission path is discarded, thereby generating a new secret key. As describe above, the error correction process, residual error detection process, and privacy amplification process require shared random numbers to designate bit positions.

Operation of First Exemplary Embodiment

The operation of the quantum cryptosystem according to the first exemplary embodiment of the present invention will be described next with reference to FIGS. 6A to 6C.

FIG. 6A illustrates a case in which the operating point of the LN intensity modulator is at a correct position. The highest light intensity state corresponds to the signal state, and the lowest light intensity state corresponds to the decoy state. Since the mark ratio of the LN intensity modulator driving signal is shifted from 50%, the signal state is created more often. Hence, the average light intensity is close to that of the signal state. That is, the photon number measured by the photon detector is almost decided by the light intensity of the signal state.

Figure 6B:
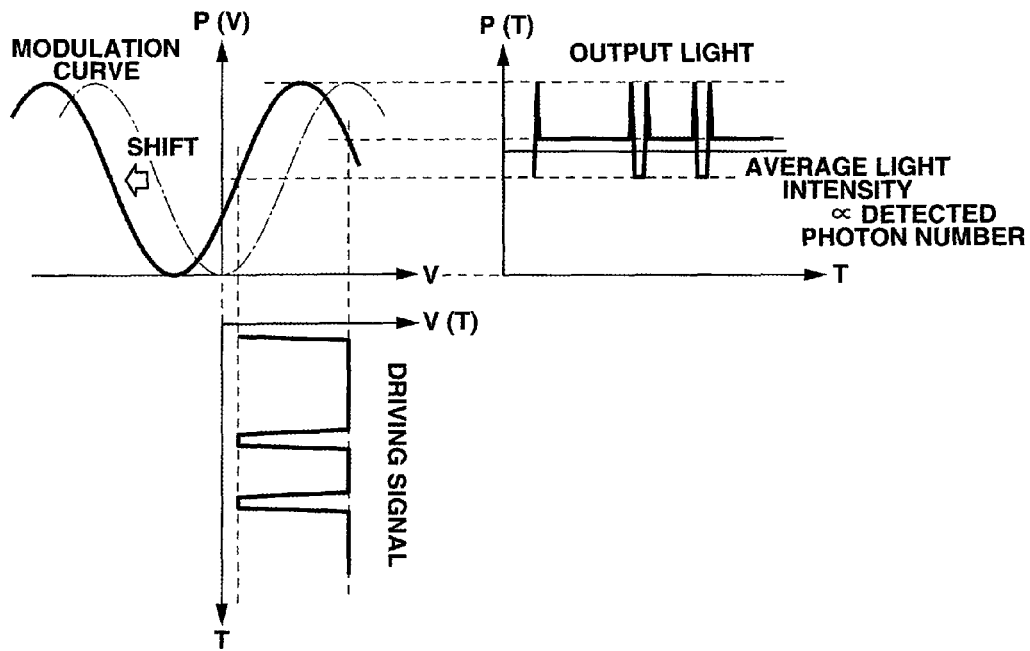
FIG. 6B is a timing chart showing the optical modulation operation (negative shift) of the optical modulator in the quantum cryptographic transmitter.

On the other hand, FIG. 6B illustrates a case in which the modulation curve shifts to the negative side (the left side in the drawing) in accordance with the modulator driving signal. The optical output corresponding to a voltage at which the light is extinguished best in FIG. 6A becomes stronger. In addition, the optical output corresponding to a voltage at which the light is transmitted best becomes weaker. However, the average light intensity is close to that of the signal state and therefore lowers obviously as compared to FIG. 6A.

Figure 6C:
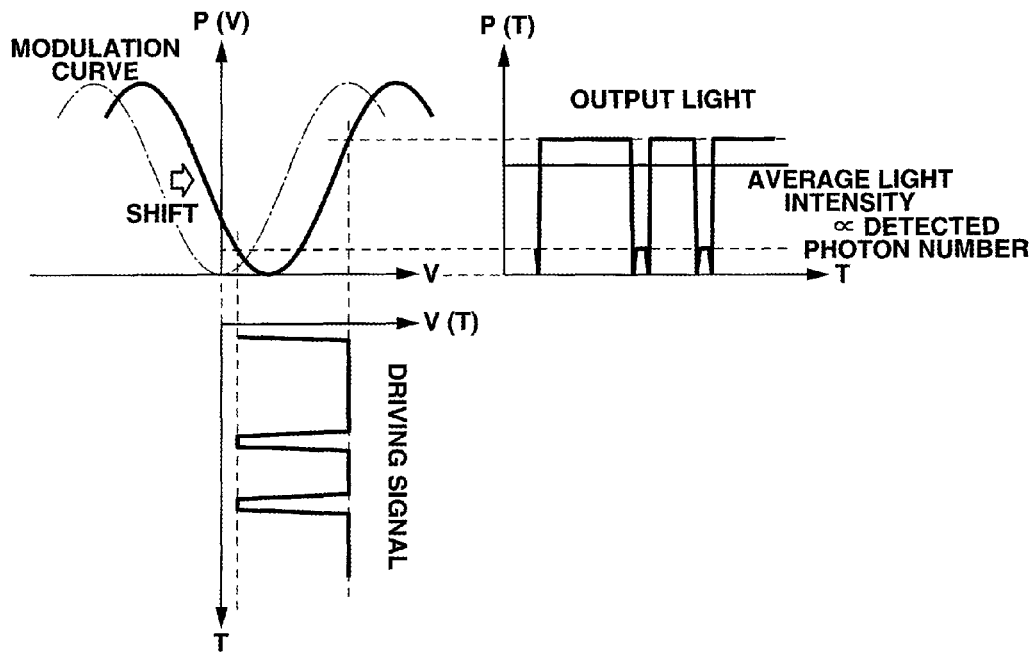
FIG. 6C is a timing chart showing the optical modulation operation (positive shift) of the optical modulator in the quantum cryptographic transmitter.

Similarly, when the modulation curve shifts to the positive side (the right side in the drawing), as shown in FIG. 6C, the average light intensity lowers obviously as compared to FIG. 6A. That is, to keep the modulation curve and modulator driving signal in the state of FIG. 6A, the bias control circuit 1108 shown in FIG. 1 is driven to maximize the photon number measured by the counting circuit 135.

The optical modulator bias control operation in the quantum cryptosystem according to the first exemplary embodiment of the present invention will be described next with reference to FIG. 7. An example will be explained here in which the number of photons detected from all optical pulses per unit time is used as photon detection information. However, the number of photons detected from an optical pulse of a given modulation factor may be used as photon detection information. Alternatively, the ratio of the numbers of photons detected from optical pulses of different modulation factors may be used as photon detection information.

The counting circuit 135 of the quantum cryptographic receiver 13 sequentially transmits the photon number measured per unit time of T sec to the bias control circuit 1108. The bias control circuit 1108 of the quantum cryptographic transmitter 11 receives, from the quantum cryptographic receiver 13, a measured photon number N that is the photon number detected per unit time, and stores an initial value "0" in a storage unit (not shown) as a variable Flg to decide the positive/negative of the bias control direction (step S401). Only for the first time, the bias of the modulated signal is shifted by, e.g., $+V_0$ (step S402).

Next, the bias control circuit 1108 stores the measured photon number N sent from the quantum cryptographic receiver 13 in the storage unit as N' and compares it with the next new measured photon number N per unit time (step S403). If N−N' is larger than a reference value $N_{ref1}$ preset in the storage unit, i.e., if the total measured photon number has increased due to the bias shift (YES in step S404), the value of the variable Flg is confirmed. If the value Flg is "0" (YES in step S405), the bias of the modulated signal is shifted by $+V_0$, i.e., to the positive side (step S406). If the value Flg is "1" (NO in step S405), the bias of the modulated signal is shifted by $-V_0$, i.e., to the negative side (step S407).

When the determination in step S405 is done for the first time, the process always advances to step S406 because the variable Flg has been set to the initial value "0". After the bias shift in step S406 or S407, the process returns to step S403 to repeatedly execute the comparison between the current measured photon number N' and the next measured photon number N per unit time.

If N−N' is equal to or smaller than the reference value $N_{ref1}$ in step S404 (NO in step S404), N'−N is compared with a reference value $N_{ref2}$ preset in the storage unit. If N'−N is larger than a reference value $N_{ref2}$, i.e., if the total measured photon number has decreased due to the bias shift (YES in step S408), the value of the variable Flg is confirmed. If the value Flg is "0" (YES in step S409), the bias of the modulated signal is shifted by $-V_0$, i.e., to the negative side, and simultaneously, "1" is set in Flg (step S410). If the value Flg is "1" (NO in step S409), the bias of the modulated signal is shifted by $+V_0$, i.e., to the positive side, and simultaneously, "0" is set in Flg (step S411).

Since the measured photon number in the photon receiver varies with a specific error, $N_{ref1}$ and $N_{ref2}$ preferably cover beyond the error range. After the bias shift in step S406 or S407, the process returns to step S403 to repeatedly execute the comparison between the current measured photon number N' and the next new measured photon number N per unit time.

Controlling the bias of the modulated signal in accordance with the above-described procedure enables to maintain the correct relation between the modulation curve and the modulated signal.

Effects of First Exemplary Embodiment

A conventional auto bias control circuit cannot control the bias of the light intensity modulator used in the quantum cryptosystem. The reason is as follows. In the conventional method, a monitor PD receives light output from the modulator, and bias control is executed based on the information of the optical signal after modulation. However, the quantum cryptosystem uses a low-intensity optical signal of single photon level, and it is therefore impossible to obtain modulated optical signal information using a monitor PD.

In this exemplary embodiment, the quantum cryptographic transmitter 11 causes the phase modulators 1103 and 1104 and the LN intensity modulator 1105 to perform optical phase modulation and light intensity modulation of an optical signal based on desired data, thereby generating a desired optical signal to be transmitted to the quantum cryptographic receiver 13. The bias control circuit 1108 controls the operating point in light intensity modulation of the LN intensity modulator 1105 based on the number of photons detected from the desired optical signal. This enables to detect the optical signal state after modulation as a detected photon number and control the operating point in light intensity modulation based on the detected photon number even in quantum communication that uses a light intensity of single photon level.

It is therefore possible to appropriately control the operating point in optical modulation of an optical signal even in a quantum cryptosystem for transmitting/receiving desired data using an optical signal having a low intensity as a medium and maintain a stable optical modulation operation for a long time.

In addition, bias control of the LN intensity modulator 1105 of the quantum cryptographic transmitter 11 is performed based on photon detection information from the photon detector 133 arranged in the quantum cryptographic receiver 13 to receive a signal of single photon level. This allows to minimize the number of components to be newly added for photon detection and reduce the cost of the entire system.

In this exemplary embodiment, an example has been described in which the photon detection information obtained in the quantum cryptographic receiver 13 is sent to the quantum cryptographic transmitter 11. However, the present invention is not limited to this. The photon detection information may be obtained in the quantum cryptographic transmitter 11.

Figure 8:
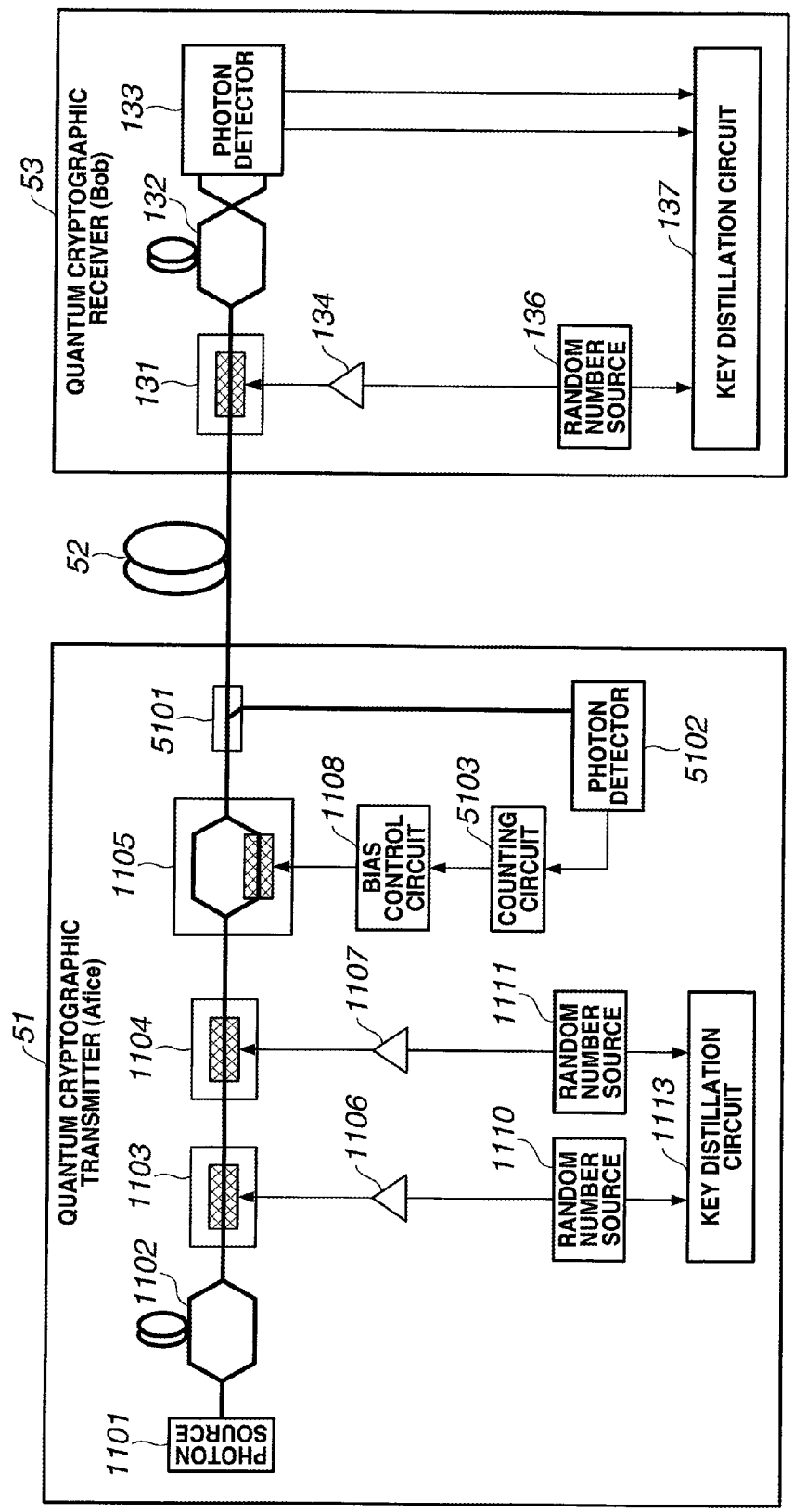
FIG. 8 is a block diagram showing another arrangement of the quantum cryptosystem according to the first exemplary embodiment of the present invention.

In an example shown in FIG. 8, a spectrometer 5101 is provided immediately after the output from the LN intensity modulator 1105 in a quantum cryptographic transmitter 51 to split light. One component is transmitted to a quantum cryptographic receiver 53 via an optical transmission path 52. The other component is sent to a photon detector 5102 to detect photons. Based on the obtained photon detection information, a counting circuit 5103 measures the detected photon number per unit time in the photon detector 133 and feeds it back to the bias control circuit 1108. At this time, the LN intensity modulator 1105 outputs light of an appropriate intensity in consideration of the decrease in the light intensity due to splitting by the spectrometer 5101.

The method used by a conventional bias control circuit, i.e., superimposing a pilot signal having a frequency fp [Hz] on a modulator driving signal and monitoring the 2 fp [Hz] component of the modulated optical signal to improve the control accuracy is not applicable to control the light intensity modulator used in quantum key distribution. The reason is as follows. To obtain signal information after intensity modulation in quantum key distribution, a photon detector needs to be used. However, the photon detector obtains only binary information representing that a photon is detected or not detected in each pulse. For this reason, even when the fp [Hz] pilot signal is superimposed on the modulator driving signal, the 2 fp [Hz] component cannot be extracted from photon detection information.

In this exemplary embodiment, the mark ratio of the modulator driving signal is shifted from 50%. This makes it possible to accurately monitor the bias variation of the modulator based on only the information of the total number of detected photons. When the mark ratio of a transmission signal is shifted from 50% in normal optical communication, the transmissible information amount decreases. However, in quantum key distribution using a decoy state, the shift of the mark ratio can effectively be used. This also applies to changing the ratio of three or more multilevel values, as in the second exemplary embodiment to be described later, instead of shifting the mark ratio from 50%.

In general, an optical pulse of the decoy state is used not to share a random number serving as the base of encryption key generation but to monitor a change in the measured photon number or transmission path loss in case of PNS eavesdropping. Reasons are as follows. When the optical pulse of the decoy state is used to share a random number, the amount of calculations for leaked information amount estimation increases. In addition, the average photon number of the decoy state is smaller than that of the signal state, and it is substantially impossible to share many bits. For these reasons, the modulator driving signal level is set such that the light intensity of the signal state corresponds to the maximum transmission intensity of the modulation curve, and the light intensity of the decoy state corresponds to an appropriate extinction state. Additionally, the mark ratio is shifted from 50% in a direction of increasing the ratio of the signal state. This can implement effective quantum key distribution.

In this exemplary embodiment, the average photon number of the decoy state is set to be smaller than that of the signal state. However, when the average photon number of the decoy state is set to be larger than that of the signal state, the same discussion as described above can take place by reversely using an optical pulse of the decoy state to share a random number and shifting the mark ratio in a direction opposite to that of this exemplary embodiment.

In this exemplary embodiment, when generating a transmission optical signal, intensity modulation is performed after phase modulation of an optical pulse. However, the modulation order may be reversed. In this exemplary embodiment, two phase modulators are used to set the four states of the phase of an optical pulse. Instead, one phase modulator may be driven by a quaternary signal.

Second Exemplary Embodiment

Figure 9:
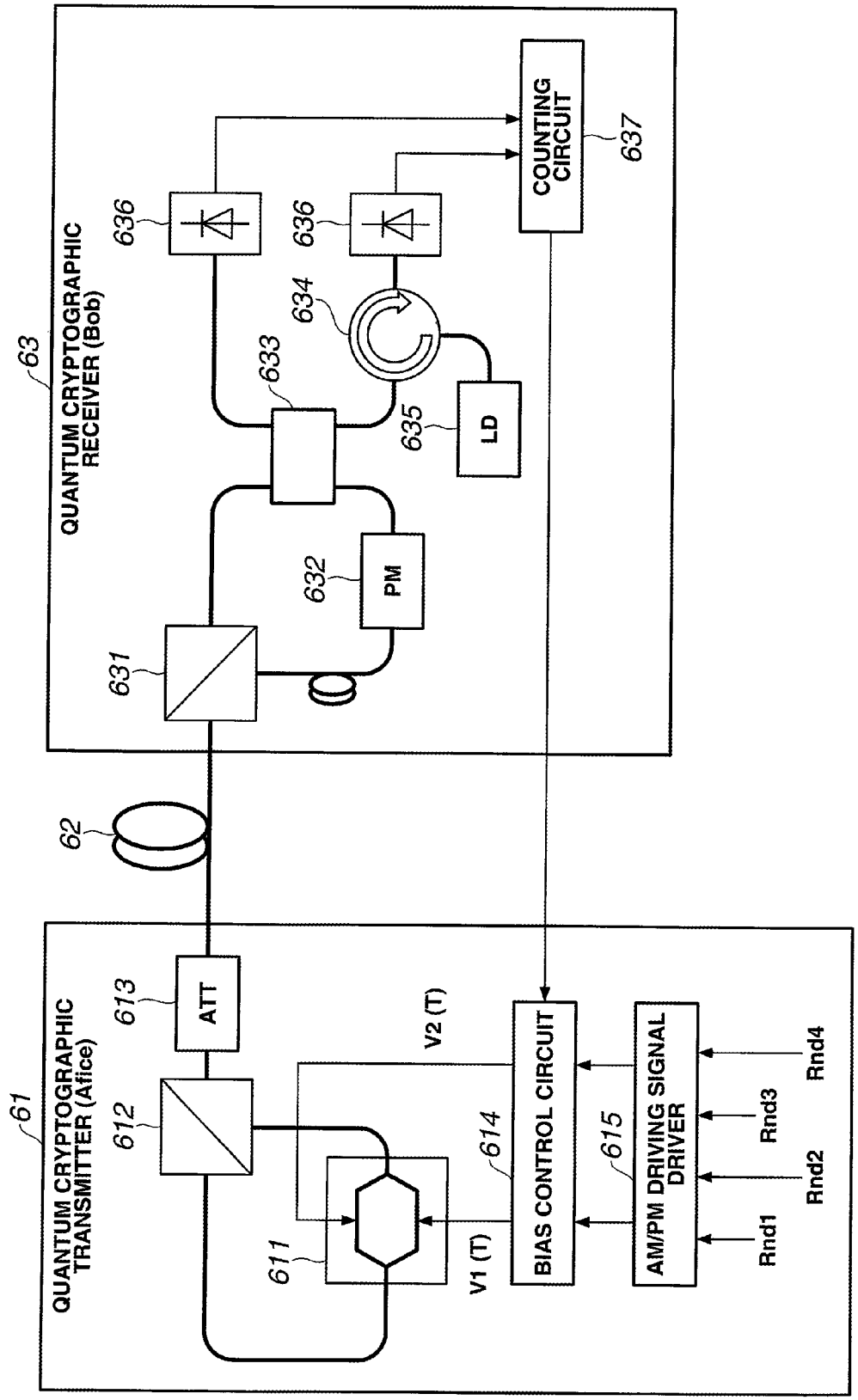
FIG. 9 is a block diagram showing the arrangement of a quantum cryptosystem according to the second exemplary embodiment of the present invention.

A quantum cryptosystem according to the second exemplary embodiment of the present invention will be explained next with reference to FIG. 9.

The quantum cryptosystem includes a quantum cryptographic transmitter 61 which optically modulates an optical signal having a low intensity of single photon level using desired data such as a random number or an encryption key and transmits the signal, and a quantum cryptographic receiver 63 which detects the optical signal received from the quantum cryptographic transmitter 61 via an optical transmission path 62 and outputs the original data.

In the first exemplary embodiment, an example has been described in which the decoy state is introduced to a one-way quantum key distribution system as described in reference 9. In the second exemplary embodiment, an example will be described in which a decoy state is introduced to a two-way quantum key distribution system as described in reference 2. The decoy state will be set as average photon number=0.3 [photons/pulse], and a signal state as average photon number=0.6 [photons/pulse] hereinafter. To accurately estimate the leaked information amount, a state corresponding to average photon number=0 is additionally set.

The quantum cryptographic receiver 63 is an optical communication apparatus configured to perform quantum communication by optically modulating an optical signal of single photon level. The quantum cryptographic receiver 63 includes, as main functional units, a polarization multiplexer 631, phase modulator 632, optical coupler 633, circulator 634, laser diode 635, photon detector 636, and counting circuit 637.

In the quantum cryptographic receiver 63, an optical pulse output from the laser diode 635 is sent to the optical coupler 633 via the circulator 634. The optical coupler 633 divides the optical pulse into two pulses. One of the pulses is directly sent to the polarization multiplexer 631. The other is sent to the polarization multiplexer 631 via the phase modulator 632.

The polarization multiplexer 631 multiplexes the two optical pulses input from the optical coupler 633 and the phase modulator 632 and sent them to the optical transmission path 62. At this time, a difference is provided between the two paths so that the two pulses are temporally divided and multiplexed.

The quantum cryptographic transmitter 61 is an optical communication apparatus configured to perform quantum communication by optically modulating an optical signal of single photon level. The quantum cryptographic transmitter 61 includes, as main functional units, a dual-drive LN modulator 611, polarization multiplexer/demultiplexer 612, optical attenuator 613, bias control circuit 614, and AM/PM driving signal driver 615. The dual-drive LN modulator 611 implements a first optical modulator and a second optical modulator.

The optical pulse which has passed through the optical transmission path 62 is received by the quantum cryptographic transmitter 61 and demultiplexed by the polarization multiplexer/demultiplexer 612 in accordance with the polarized state. After demultiplexing, the dual-drive LN modulator 611 performs phase modulation and intensity modulation every time the optical pulses circulate through the PBS loop. The polarization multiplexer/demultiplexer 612 multiplexes the optical pulses again and reflects them to the quantum cryptographic receiver 63. Using a modulation method described in Japanese Patent Laid-Open No. 2003-335228 (to be referred to as reference 13 hereinafter) allows to rotate the polarized light by 90° and reflect it.

In this exemplary embodiment, to implement the modulation method described in reference 13, the method of reference 6 using the dual-drive LN modulator 611 is used. Based on the values of input signals RND1 to RND4 of the AM/PM driving signal driver 615, the dual-drive LN modulator 611 sets the phase and intensity of the optical pulse. For example, the phase is set by setting data and basis based on RND1 and RND2, and the intensity is set based on RND3 and RND4.

The optical pulse has a polarized state rotated by 90° from that in the forward path when arriving at the quantum cryptographic receiver 63 via the optical transmission path 62. For this reason, the polarization multiplexer 631 sends each pulse to a path different from that in the forward path.

Hence, both light components divided by the optical coupler 633 are sent from the quantum cryptographic receiver 63 and pass through paths of the same length through the quantum cryptographic receiver 63→quantum cryptographic transmitter 61→quantum cryptographic receiver 63. The light components are then multiplexed again by the optical coupler 633 so that interference occurs. The interfered optical pulse of single photon level is detected using the photon detector 636 in a balanced gate mode described in reference 10.

Figure 10A:
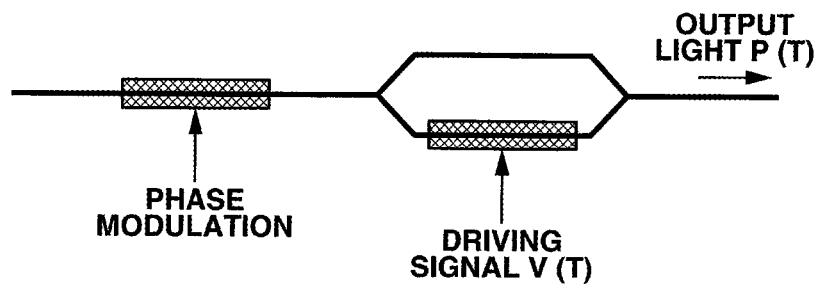
FIG. 10A is a schematic view showing a dual-drive light intensity modulator.
Figure 10B:
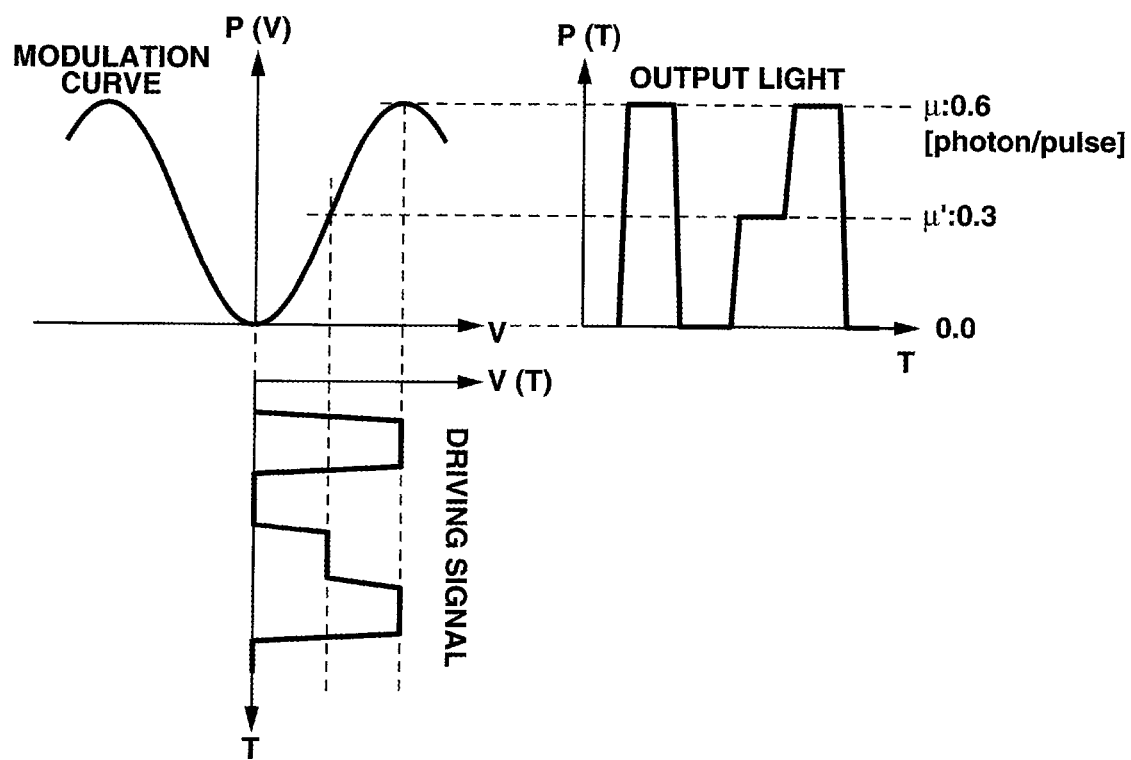
FIG. 10B is a timing chart showing the modulation operation of the dual-drive light intensity modulator.

In this exemplary embodiment, a method of simultaneously modulating the phase and intensity of an optical signal using the method of reference 6 is employed. As shown in FIGS. 10A and 10B, the functions of the dual-drive light intensity modulator can equivalently be expressed separately by a optical phase modulation unit and a light intensity modulation unit. Intensity modulation sets the average photon number of each pulse to three states, i.e., $\mu$: 0.6 [photons/pulse], $\mu'$: 0.3 [photons/pulse], and 0 [photons/pulse]. In this case, $\mu > \mu' > 0$. For this purpose, the modulator driving signal takes three values, and the ratio of the three values is shifted from 1:1:1.

Operation of Second Exemplary Embodiment

The operation of the quantum cryptosystem according to the second exemplary embodiment of the present invention will be described next with reference to FIG. 11.

Figure 7:
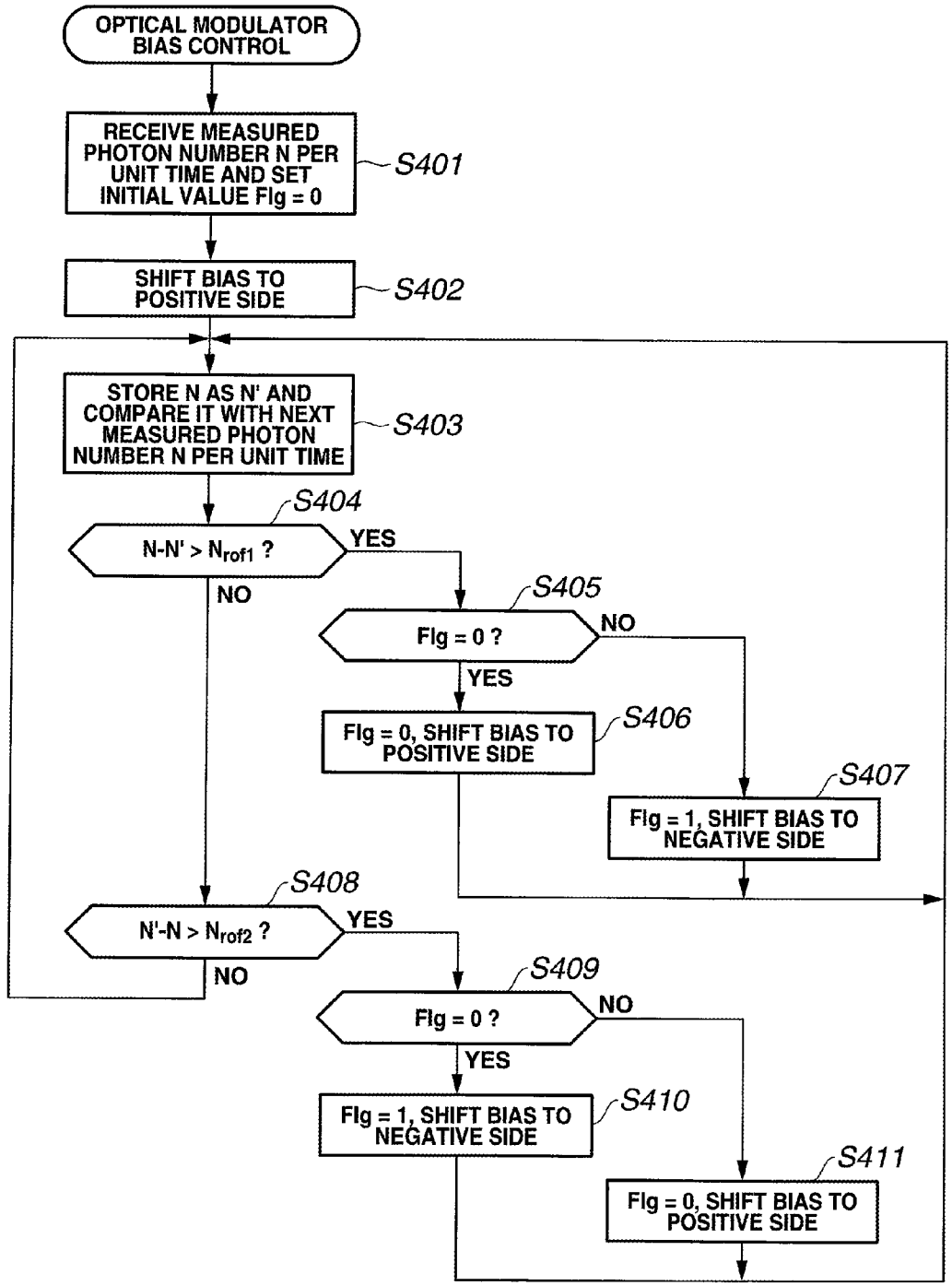
FIG. 7 is a flowchart showing optical modulator bias control processing of the quantum cryptosystem according to the first exemplary embodiment of the present invention.
Figure 11:
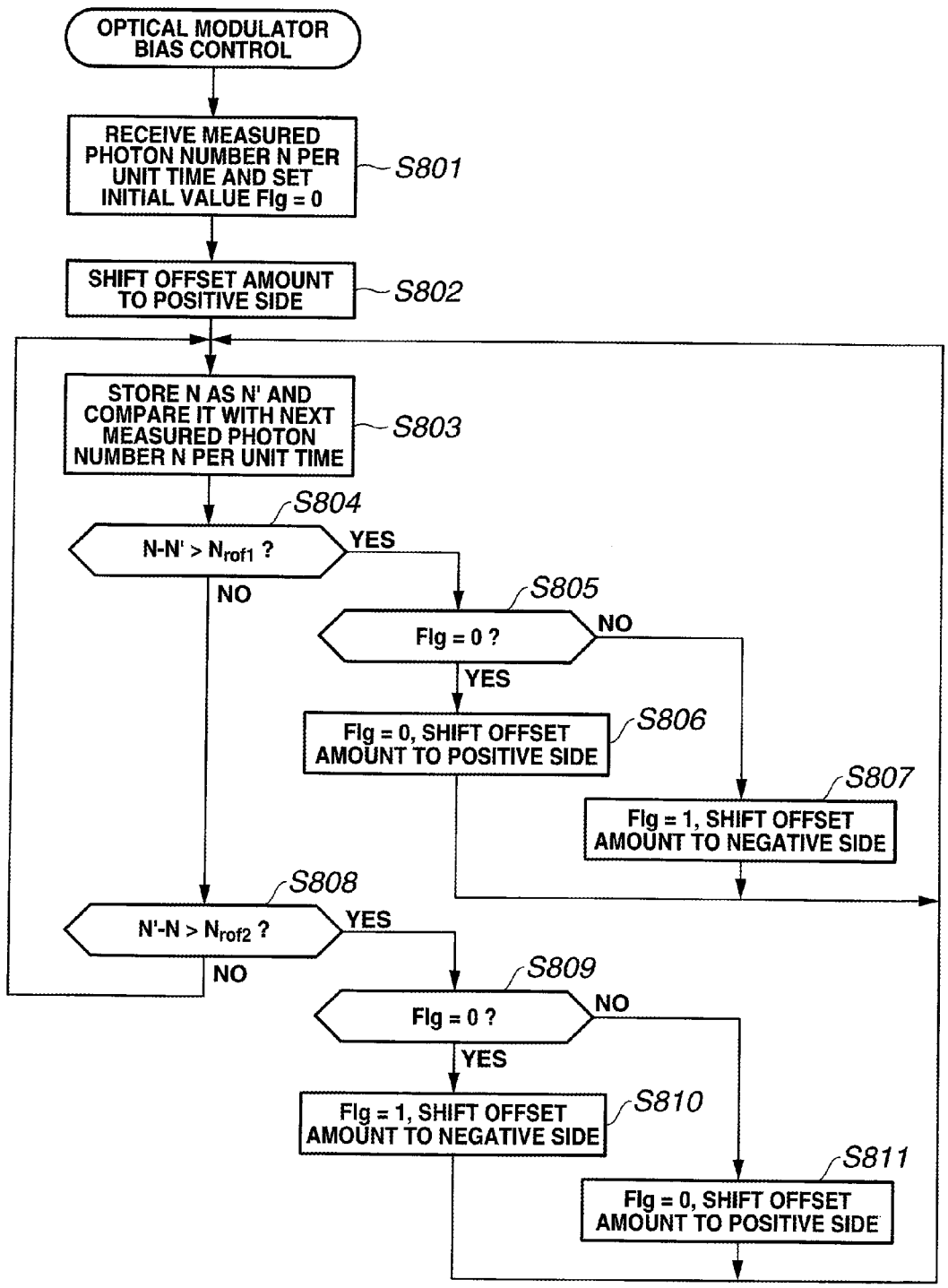
FIG. 11 is a flowchart showing optical modulator bias control processing of the quantum cryptosystem according to the second exemplary embodiment of the present invention.

In this exemplary embodiment, bias control can be done using the flowchart in FIG. 11 in which the optical modulator bias control processing in FIG. 7 is changed a little. More specifically, in place of the bias shift performed in steps S402, S406, S407, S410, and S411 of FIG. 7, the bias control circuit 614 changes the offset between driving signals V1(T) and V2(T) of the dual-drive LN modulator 611 based on photon detection information, i.e., the detected photon number per unit time from the counting circuit 637 in the quantum cryptographic receiver 63 (S802, S806, S807, S810, and S811). The remaining steps are the same as in FIG. 7, and a description thereof will not be repeated here.

In the first exemplary embodiment, a case has been described in which intensity modulations of different modulation factors are performed at a nonuniform frequency using a binary driving signal. In the second exemplary embodiment, however, a case using a ternary driving signal will be explained. Note that a ternary driving signal may be used in the first exemplary embodiment, and a binary driving signal may be used in the second exemplary embodiment.

The set ratio $P_\mu:P_{\mu'}:P_0$ of the three values of the modulator driving signal is randomly changed (shifted) to three states 1:1:1, 4:1:1, and 16:1:1.

Figure 12A:
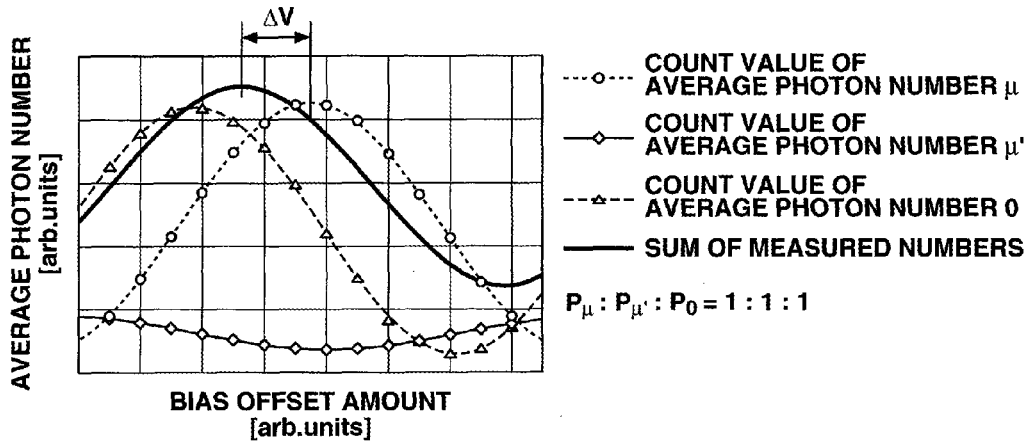
FIG. 12A is a graph for explaining a change in the measured count of a photon detector caused by changing the offset between driving signals ($P_\mu:P_\mu:P_0=1:1:1$)
Figure 12B:
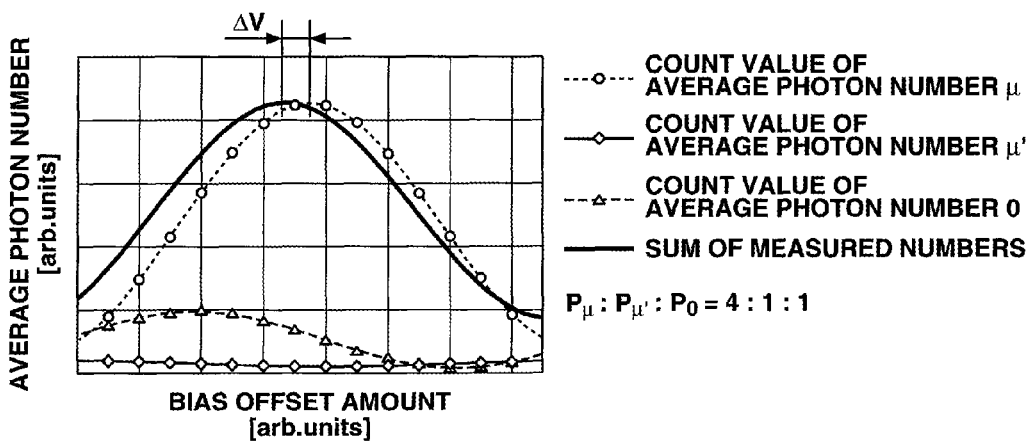
FIG. 12B is a graph for explaining a change in the measured count of the photon detector caused by changing the offset between driving signals ($P_\mu:P_\mu:P_0=4:1:1$)
Figure 12C:
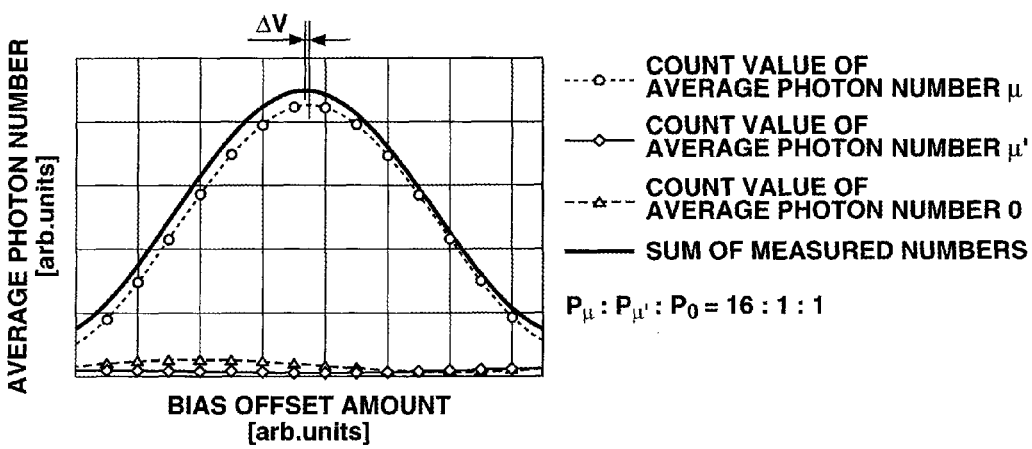
FIG. 12C is a graph for explaining a change in the measured count of the photon detector caused by changing the offset between driving signals ($P_\mu:P_\mu:P_0=16:1:1$)

Referring to FIGS. 12A to 12C, a value plotted by ○ represents a measured photon number per unit time for optical pulses having the average photon number μ. A value plotted by Δ represents a measured photon number per unit time for optical pulses having the average photon number μ'. A value plotted by ◊ represents a measured photon number per unit time for optical pulses having the average photon number 0. A value plotted by—represents the sum of all measured photon numbers. Since the operating point shown in FIG. 10B is ideal, the offset amount at which the measured photon number for the average photon number μ is maximized indicates the optimum operating point.

In the case of $P_\mu:P_{\mu'}:P_0=1:1:1$ shown in FIG. 12A, the offset amount at which the measured photon number for the average photon number μ is maximized and the offset amount at which the sum of measured photon numbers is maximized have a shift of ΔV. This is because since the set ratio of μ' is sufficiently high, the occupation ratio of μ' in the sum of measured photon numbers is not negligible.

In the case of $P_\mu:P_{\mu'}:P_0=4:1:1$ shown in FIG. 12B, the shift is smaller. In the case of $P_\mu:P_{\mu'}:P_0=16:1:1$ shown in FIG. 12C, the shift is further smaller, and it can be conformed that ΔV is almost zero. More specifically, the bias control circuit 614 changes the offset amount in accordance with the optical modulator bias control processing shown in FIG. 11 so as to maximize the sum of detected photon numbers in a state in which the modulator driving signal set ratio is shifted, thereby controlling the bias of the dual-drive LN modulator 611.

Effects of Second Exemplary Embodiment

A conventional two-way quantum key distribution system cannot obtain information of output light using a simple monitor PD. Especially, when probe light as described in reference 8 is used, signal light of single photon level is buried in noise light such as Rayleigh scattered light or Raman scattered light regardless of whether the probe light and the signal light have the same or different wavelengths. A means for reducing signal light to the single photon level after monitoring a modulated signal at a sufficient light intensity in the quantum cryptographic transmitter is not applicable due to the following reason. The reason will be explained below.

In the two-way quantum key distribution system, the photon detector observes backscattered light of an optical pulse in the forward path as noise. Out of the backscattered light, Rayleigh scattered light without any wavelength change cannot be separated from signal light by a wavelength filter and most largely influences the encryption key generation performance. The intensity of the Rayleigh scattered light is decided by the intensity of the transmission light, i.e., the intensity of the optical pulse output from the quantum cryptographic receiver. For this reason, depending on the optical loss in the quantum cryptographic transmitter, the normal signal light turned from the quantum cryptographic transmitter is buried in the backscattered noise light. As detailed numerical values, for example, let Pin be the intensity of input light to the fiber, Cs be the Rayleigh backscattering coefficient, and α be the transmission loss. In this case, a Rayleigh backscattered light intensity P is given by $$P = P_{in} \times C_s \times \frac{10}{\ln 10} \times \frac{1}{2\alpha} \times \left\{1 - \exp\left(-\frac{\ln 10}{10} \times 2\alpha \times L\right)\right\} \quad \text{[Mathematical 1]}$$

The Rayleigh backscattering coefficient Cs for a common single-mode optical fiber (SMF: Single Mode Fiber) is about −70 [dB/m] at a wavelength of 1550 [nm]. Hence, in a single-mode optical fiber having a length of 40 [km], backscattered light of −30.75 [dB] is observed with respect to the transmission light intensity. On the other hand, considering a transmission loss of −20 [db] (=−0.25 [dB/km]×40 [km]×2) for a round trip through 40 km and an optical loss of about 10 [dB] of the quantum cryptographic transmitter, the light intensity of the major signal returned to the quantum cryptographic receiver corresponds to a transmission signal intensity of −30 [dB]. That is, in this example, noise light having the same intensity as that of the signal light is observed. Since the backscattered light is continuum, and the normal optical signal is pulse light, as a matter of course, the calculated SN ratio cannot be obtained at the time of photon detection. However, it is necessary to make the optical loss of the quantum cryptographic transmitter as small as possible, as can be seen. As a result, to vary the bias of the modulator, the light intensity of single photon level needs to be monitored.

In this exemplary embodiment, however, the operating point in light intensity modulation is controlled based on the number of photons detected from an optical signal which has undergone phase modulation and intensity modulation, as in the first exemplary embodiment. For this reason, even in quantum communication using the light intensity of single photon level, the state of the optical signal after modulation can be detected as the detected photon number, and the operating point in light intensity modulation can be controlled based on the detected photon number.

It is therefore possible to appropriately control the operating point in optical modulation of an optical signal even in a quantum cryptosystem for transmitting/receiving desired data using an optical signal having a low intensity as a medium and maintain a stable optical modulation operation for a long time.

In this exemplary embodiment, the mark ratio of the modulator driving signal is shifted from 50%. This makes it possible to accurately monitor the bias variation of the modulator based on only the information of the total number of detected photons. When the mark ratio of a transmission signal is shifted from 50% in normal optical communication, the transmissible information amount decreases. However, in quantum key distribution using a decoy state, the shift of the mark ratio can effectively be used. This also applies to changing the ratio of multilevel values, instead of shifting the mark ratio from 50%.

Figure 13:
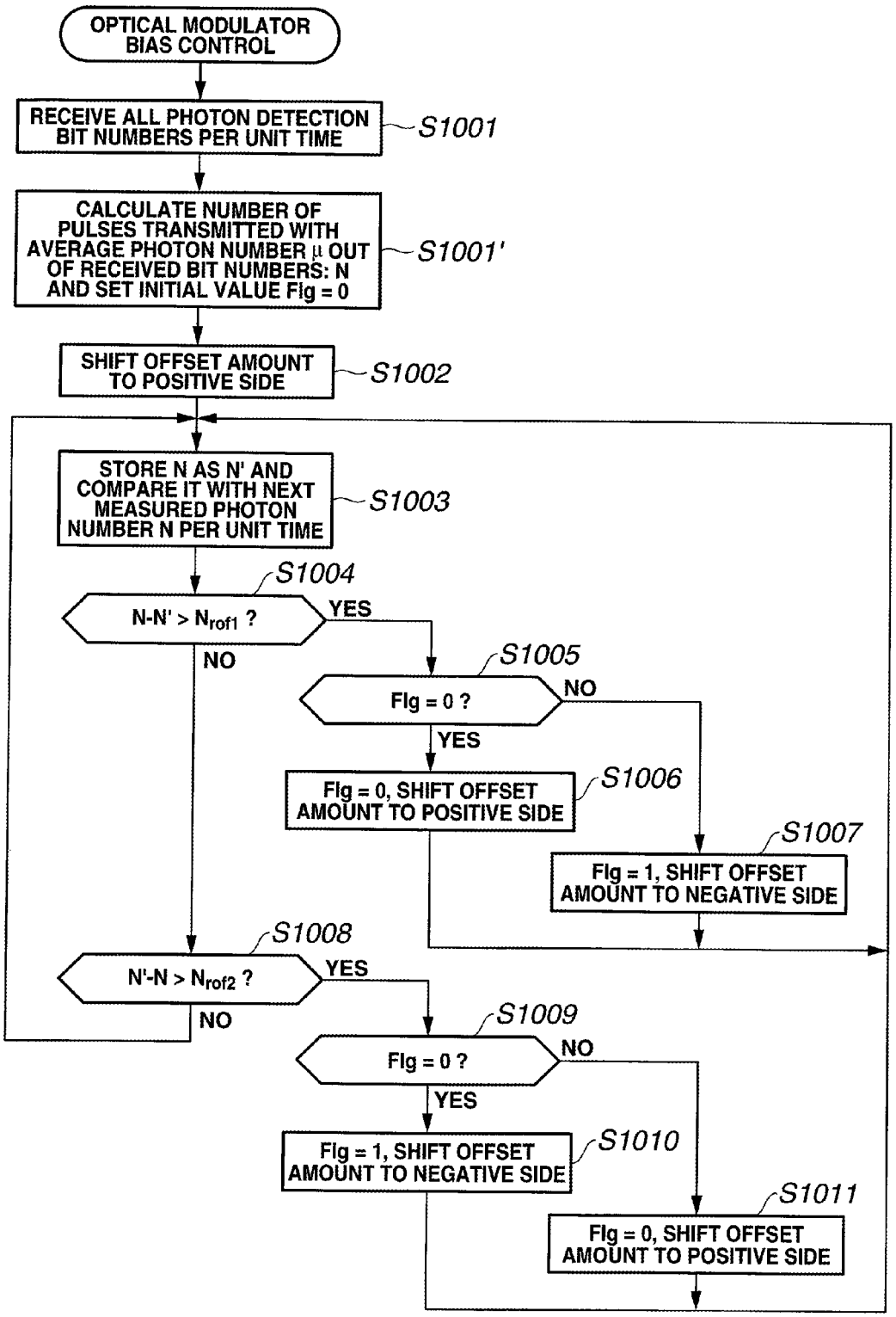
FIG. 13 is another flowchart showing optical modulator bias control processing of the quantum cryptosystem according to the second exemplary embodiment of the present invention.
Figure 14:
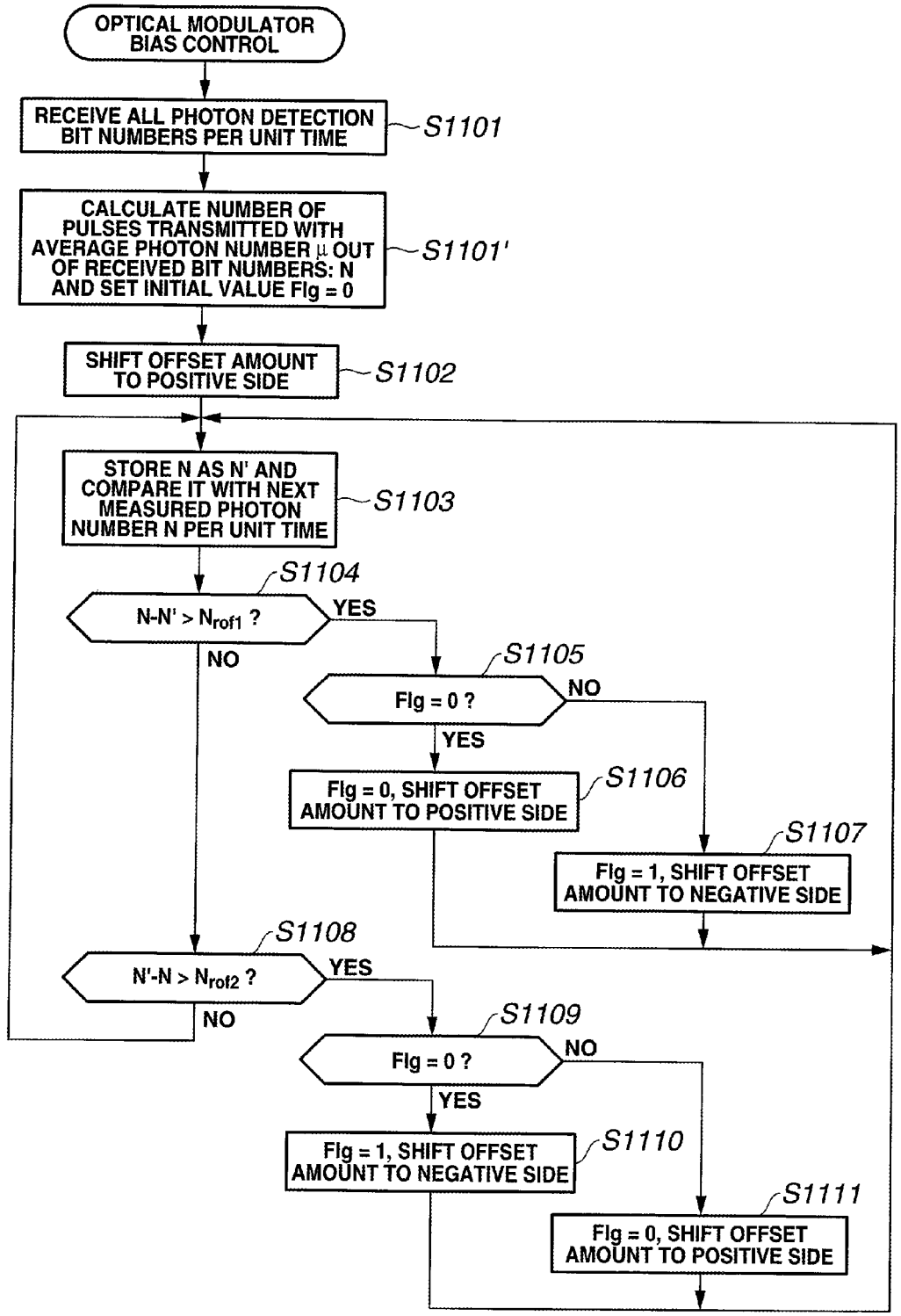
FIG. 14 is still another flowchart showing optical modulator bias control processing of the quantum cryptosystem according to the second exemplary embodiment of the present invention.
Figure 15:
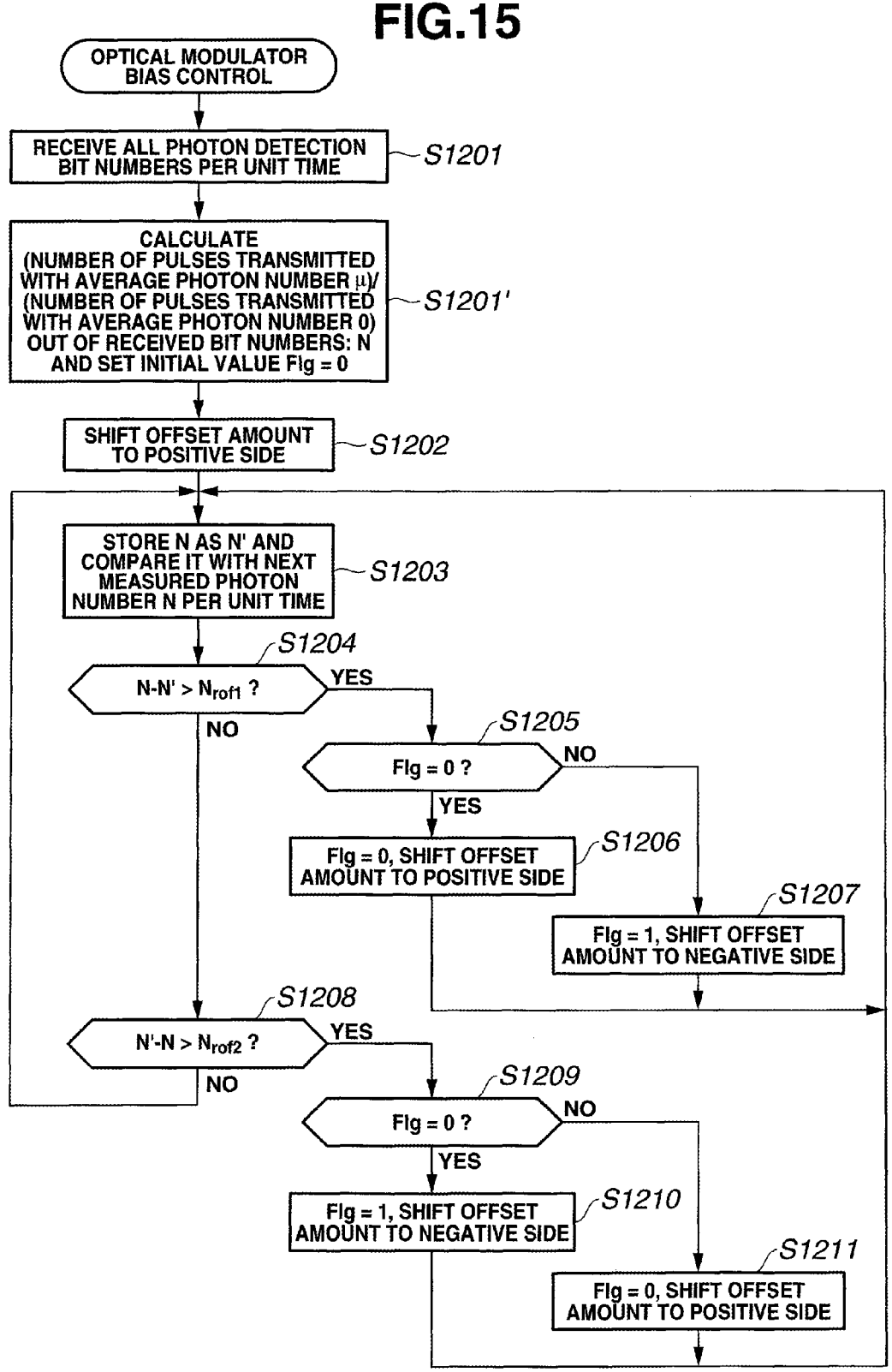
FIG. 15 is still another flowchart showing optical modulator bias control processing of the quantum cryptosystem according to the second exemplary embodiment of the present invention.
Figure 16:
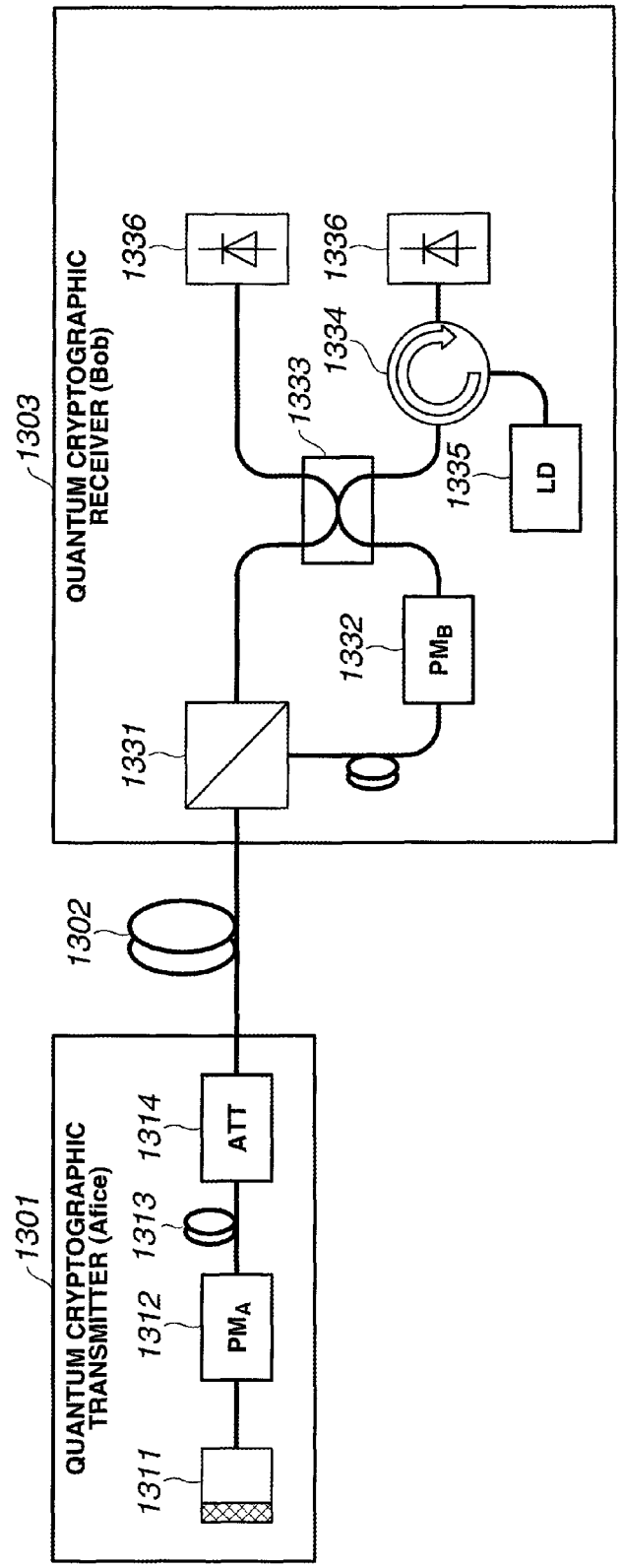
FIG. 16 is a block diagram showing the arrangement of a general quantum key distribution system.
Figure 17A:
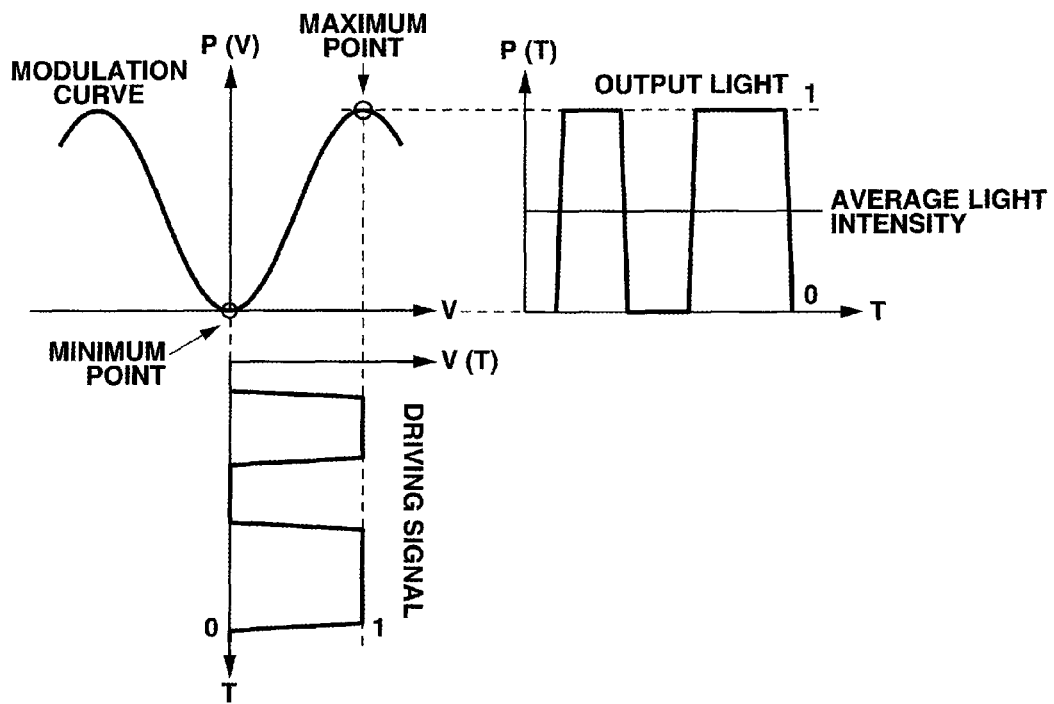
FIG. 17A is a timing chart showing distortion in the light waveform (normal) caused by the influence of drift.
Figure 17B:
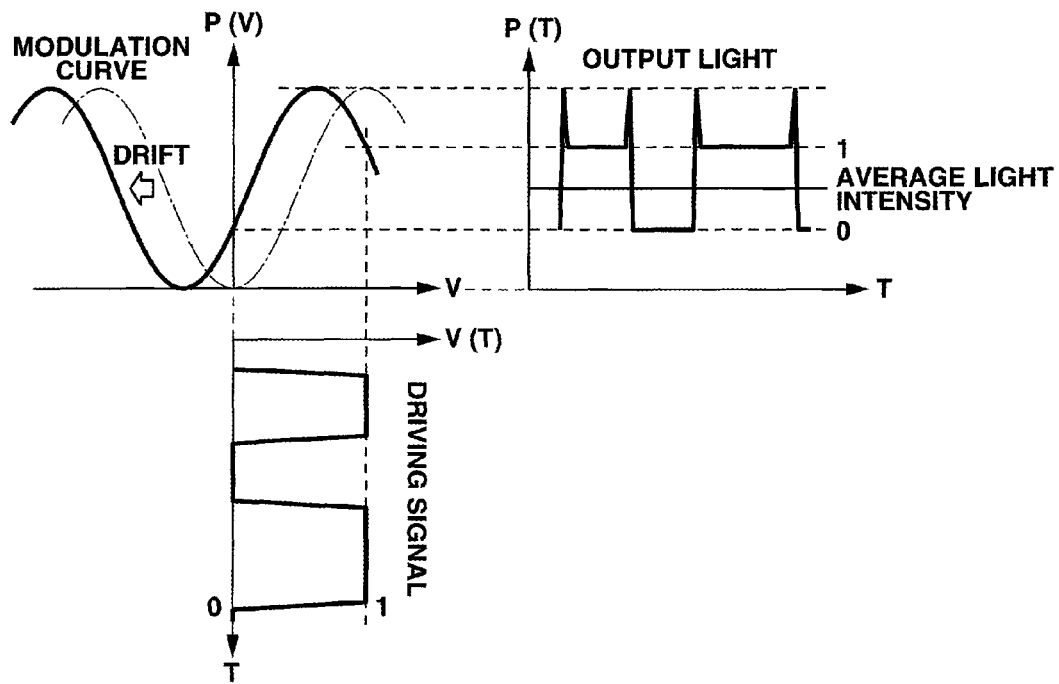
FIG. 17B is a timing chart showing distortion in the light waveform (negative drift) caused by the influence of drift.
Figure 17C:
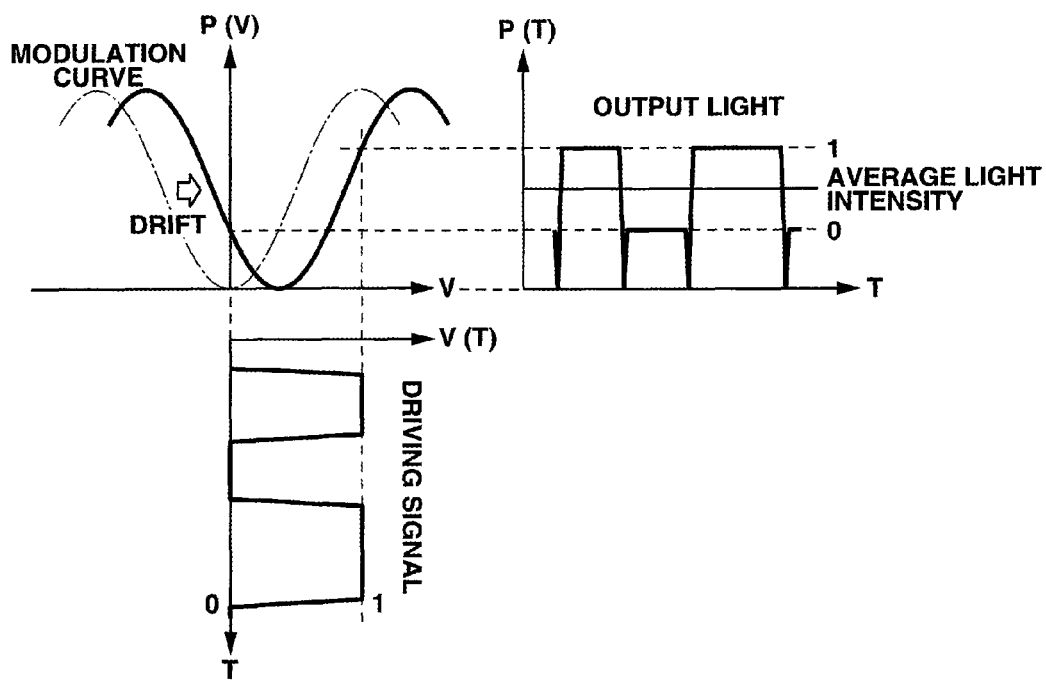
FIG. 17C is a timing chart showing distortion in the light waveform (positive drift) caused by the influence of drift.
Figure 18A:
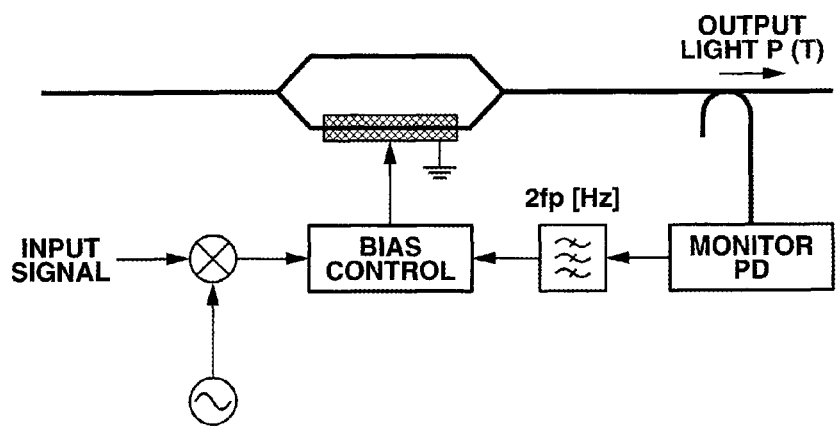
FIG. 18A is a block diagram showing the arrangement of bias voltage control described in reference 7.
Figure 18B:
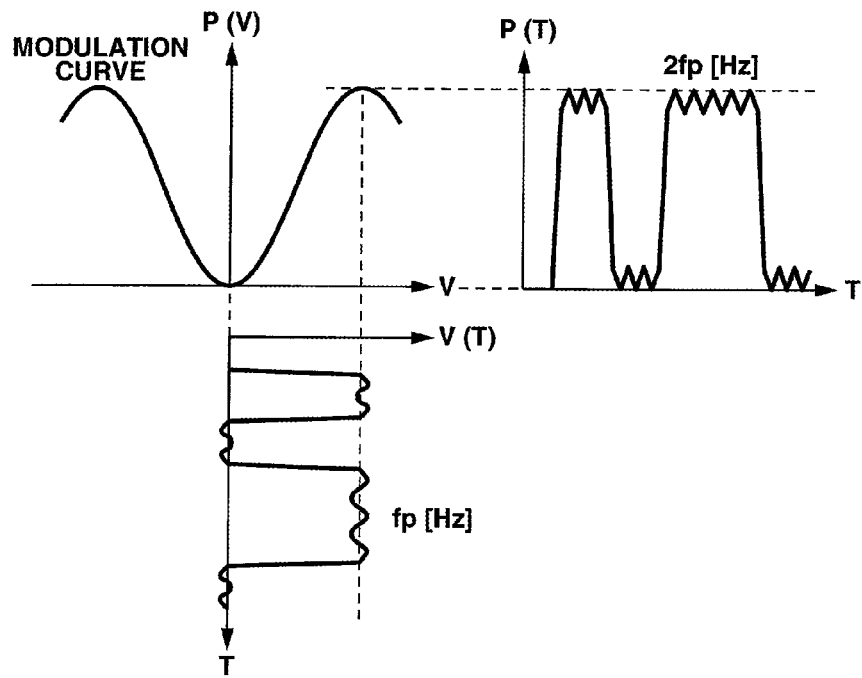
FIG. 18B is a timing chart showing a bias voltage control operation (normal) described in reference 7.
Figure 18C:
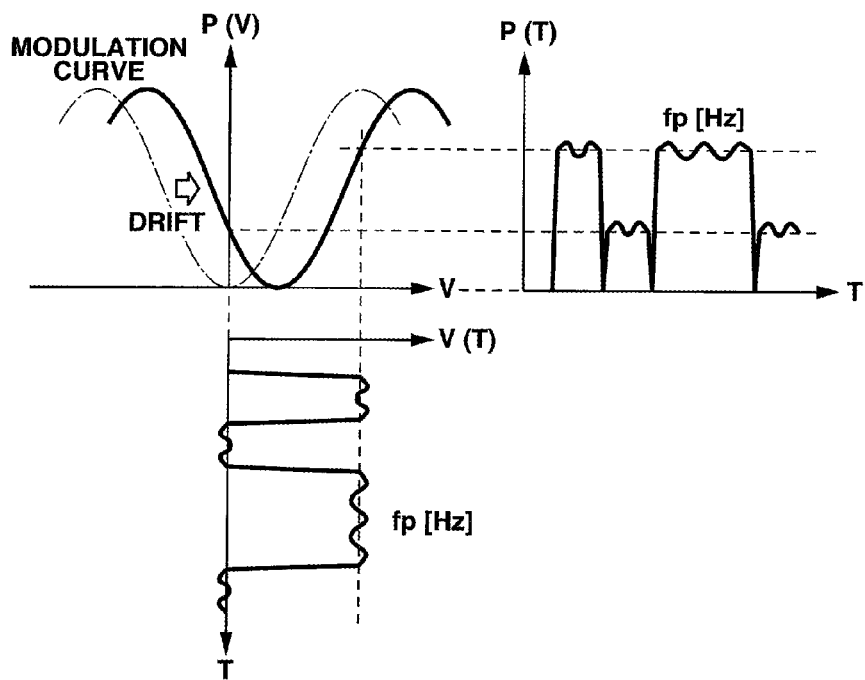
FIG. 18C is a timing chart showing a bias voltage control operation (positive drift) described in reference 7.

Even when the set ratio of the levels of the modulator driving signal is not offset, the bias of the modulator can be controlled by the optical modulator bias control processing shown in FIGS. 13 to 15.

In FIG. 13, the offset amount is changed to maximize the measured photon number per unit time for pulses having the average photon number μ. In FIG. 14, the offset amount is changed to minimize the measured photon number per unit time for pulses having the average photon number 0.

In FIG. 15, the offset amount is changed to maximize the ratio of the measured photon number per unit time for pulses having the average photon number μ to that for pulses having the average photon number 0. These are control procedures using the fact that the light intensity corresponding to the average photon number μ is maximized, and the light intensity corresponding to the average photon number 0 is minimized under an optimum operation condition, as shown in FIG. 10B. Note that it is necessary in the flowcharts shown in FIGS. 13 to 15 to manage the photon number measured by the photon detector for each set average photon number, unlike FIG. 11. For this reason, the communication amount in steps S801, S1001, S1101, and S1201 increases, and steps S1001', S1101', and S1201' are added to complicate the processing.

In this exemplary embodiment, the method of compensating for the bias drift of the dual-drive LN modulator 611 has been exemplified. However, the present invention is not limited to this. For example, an LN intensity modulator may be used as the optical attenuator 613. The bias drift of the optical attenuator (LN intensity modulator) 613 may be compensated for based on photon detection information from the photon detector 636. In this case, instead of controlling to maximize the measured photon number as shown in the flowchart of FIG. 11, the bias voltage to be applied to the dual-drive LN modulator 611 is controlled to maximize the measured photon number in the photon detector 636, and in this state, the bias of the optical attenuator (LN intensity modulator) 613 is controlled to hold a predetermined measured photon number.

Extension of Exemplary Embodiment

In the above-described exemplary embodiments, the bias control circuit 1108 controls the bias voltage of the optical modulator based on photon detection information, thereby controlling the operating point of the LN intensity modulator 1105. However, a method other than the bias voltage adjustment may be used to control the operating point of the LN intensity modulator 1105. For example, a Mach-Zehnder optical modulator which branches an input optical signal to two optical waveguides and then multiplexes and outputs them may be used as the LN intensity modulator 1105. In addition, a temperature adjusting unit which maintains an arbitrary temperature difference between the two optical waveguides may be provided. In this case, the bias control circuit 1108 controls the temperature difference maintained by the temperature adjusting unit based on photon detection information.

INDUSTRIAL APPLICABILITY

Each exemplary embodiment of the present invention is usable for a technique of generating a random number by single photon detection, which is represented by the quantum key distribution technique, in a quantum cryptosystem. The quantum key distribution protocol is not limited to BB84 but may be a protocol such as E91 or B92. The exemplary embodiments of the present invention are also applicable when a decoy state in which the light intensity of each pulse is changed is introduced to a technique of distributing an encryption key using information borne on the quantum state of photons, such as a technique of coding information on the differential phase shift. The exemplary embodiments are applicable to both a one-way quantum key distribution system and a two-way quantum key distribution system.

The invention claimed is:

1. An optical transmitter comprising:
   an optical modulator which modulates an intensity of an input optical signal and outputs the optical signal;
   a driving signal generation circuit which generates a driving signal to control intensity modulation of said optical modulator and outputs the driving signal to said optical modulator;
   an optical modulation control circuit which controls an operating point of the driving signal based on photon detection information about the number of photons detected from the optical signal that has undergone intensity modulation of said optical modulator;
   a random number source which outputs a random number having a mark ratio that is shifted from 50%,
   wherein said driving signal generation circuit generates, as the driving signal, a binary electrical signal having an offset mark ratio, based on the random number output from said random number source.

2. An optical transmitter according to claim 1, wherein said optical modulator comprises a Mach-Zehnder optical modulator which branches the input optical signal to two optical waveguides and then multiplexes and outputs the optical signal, and
   said optical modulation control circuit controls a bias voltage of said optical modulator based on the photon detection information.

3. An optical transmitter according to claim 1, wherein said optical modulator comprises a Mach-Zehnder optical modulator which branches the input optical signal to two optical waveguides and then multiplexes and outputs the optical signal,
   the optical transmitter further comprises a temperature adjusting unit which maintains an arbitrary temperature difference between the optical waveguides, and
   said optical modulation control circuit controls the temperature difference maintained by said temperature adjusting unit based on the photon detection information.

4. An optical transmitter according to claim 1, wherein said optical modulation control circuit acquires the photon detection information about the number of photons detected from the optical signal received by an optical receiver via an optical transmission path after intensity modulation.

5. An optical transmitter according to claim 1, further comprising:
   a spectrometer which splits the optical signal output from said optical modulator after intensity modulation; and
   a counting circuit which counts the number of photons of the optical signal obtained by said spectrometer and outputs a counting result as the photon detection information.

6. An optical transmitter according to claim 1, wherein the photon detection information includes a detected photon number per unit time which is detected from each optical pulse of the optical signal after intensity modulation.

7. An optical transmitter according to claim 1, wherein the photon detection information includes a detected photon number per unit time which is detected from an optical pulse of a modulation factor out of optical pulses obtained upon intensity modulation of said optical modulator using a plurality of different modulation factors.

8. An optical transmitter according to claim 1, wherein the photon detection information includes a ratio of detected photon numbers per unit time which are respectively detected from optical pulses of two modulation factors out of optical pulses obtained upon intensity modulation of said optical modulator using a plurality of different modulation factors.

9. An optical transmitter according to claim 1, wherein the photon detection information includes photon detection information about the number of photons detected from the optical signal received by an optical receiver via an optical transmission path after intensity modulation.

10. An optical transmitter according to claim 1, wherein the photon detection information includes photon detection information about the number of photons detected by branching the optical signal after intensity modulation.

11. An optical modulation control circuit comprising:
an information acquisition unit which acquires photon detection information about the number of photons detected from an optical signal which has undergone intensity modulation of an optical modulator; and
an operating point control unit which receives a driving signal to control intensity modulation of the optical modulator, controls a bias voltage of the driving signal based on the photon detection information acquired by said information acquisition unit, and outputs the driving signal to the optical modulator, thereby controlling an operating point of the optical modulator,
wherein the driving signal has an offset mark ratio generated based on a random number output by a random number source, the random number having a mark ratio that is shifted from 50%.

12. An optical modulation control circuit according to claim 11, wherein the photon detection information includes a detected photon number per unit time which is detected from each optical pulse of the optical signal after intensity modulation of the optical modulator.

13. An optical modulation control circuit according to claim 11, wherein the photon detection information includes a detected photon number per unit time which is detected from an optical pulse of a modulation factor out of optical pulses obtained upon intensity modulation of said optical modulator using a plurality of different modulation factors.

14. An optical modulation control circuit according to claim 11, wherein the photon detection information includes a ratio of detected photon numbers per unit time which are respectively detected from optical pulses of two modulation factors out of optical pulses obtained upon intensity modulation of said optical modulator using a plurality of different modulation factors.

15. An optical modulation control circuit according to claim 11, wherein the photon detection information includes photon detection information about the number of photons detected from the optical signal received by an optical receiver via an optical transmission path after intensity modulation.

16. An optical modulation control circuit according to claim 11, wherein the photon detection information includes photon detection information about the number of photons detected by branching the optical signal after intensity modulation.

17. An optical modulation control method comprising controlling, based on photon detection information about the number of photons detected from an optical signal which has undergone intensity modulation of an optical modulator, a bias voltage of a driving signal to control intensity modulation of the optical modulator and outputting the driving signal to the optical modulator, thereby controlling an operating point of the optical modulator,
wherein the driving signal has an offset mark ratio generated based on a random number output by a random number source, the random number having a mark ratio that is shifted from 50%.

18. An optical modulation control method according to claim 17, wherein the photon detection information includes a detected photon number per unit time which is detected from each optical pulse of the optical signal after intensity modulation of the optical modulator.

19. An optical modulation control method according to claim 17, wherein the photon detection information includes a detected photon number per unit time which is detected from an optical pulse of a modulation factor out of optical pulses obtained upon intensity modulation of the optical modulator using a plurality of different modulation factors.

20. An optical modulation control method according to claim 17, wherein the photon detection information includes a ratio of detected photon numbers per unit time which are respectively detected from optical pulses of two modulation factors out of optical pulses obtained upon intensity modulation of the optical modulator using a plurality of different modulation factors.

21. An optical modulation control method according to claim 17, wherein the photon detection information includes photon detection information about the number of photons detected from the optical signal received by an optical receiver via an optical transmission path after intensity modulation.

22. An optical modulation control method according to claim 17, wherein the photon detection information includes photon detection information about the number of photons detected by branching the optical signal after intensity modulation.

23. An optical transmitter according to claim 1, wherein
binary values of the electrical signal correspond to Signal state which is used for generation of an encryption key and Decoy state where a number of photons is changed from Signal state, and
the mark ratio of the electrical signal is shifted from 50% in a direction that increases the Signal state.

* * * * *